(12) United States Patent
Itoga

(10) Patent No.: US 7,377,544 B2
(45) Date of Patent: May 27, 2008

(54) OCCUPANT PROTECTION SYSTEM

(75) Inventor: Yasuo Itoga, Hikone (JP)

(73) Assignee: Takata Corporation (JP)

( * ) Notice: Subject to any disclaimer, the term of this patent is extended or adjusted under 35 U.S.C. 154(b) by 125 days.

(21) Appl. No.: 11/060,277

(22) Filed: Feb. 17, 2005

(65) Prior Publication Data
US 2005/0184491 A1 Aug. 25, 2005

(30) Foreign Application Priority Data
Feb. 20, 2004 (JP) .............................. 2004-044895
Sep. 24, 2004 (JP) .............................. 2004-277490
Dec. 17, 2004 (JP) .............................. 2004-366358

(51) Int. Cl.
*B60R 21/018* (2006.01)
(52) U.S. Cl. ................ 280/733; 280/730.1; 280/728.2; 180/268; 180/271
(58) Field of Classification Search ................ 280/733, 280/748, 806, 728.2; 180/268, 271
See application file for complete search history.

(56) References Cited

U.S. PATENT DOCUMENTS

| | | | |
|---|---|---|---|
| 5,947,514 A | | 9/1999 | Keller et al. |
| RE36,661 E * | | 4/2000 | Tanaka et al. ............... 280/733 |
| 6,109,647 A * | | 8/2000 | Akaba et al. ................ 280/733 |
| 6,481,750 B1 * | | 11/2002 | Kalina et al. ............. 280/801.1 |
| 6,802,529 B2 * | | 10/2004 | Takedomi et al. .......... 280/729 |
| 6,863,298 B2 * | | 3/2005 | Sakai et al. ............... 280/728.1 |
| 6,863,304 B2 * | | 3/2005 | Reiter et al. ................ 280/739 |
| 7,021,652 B2 * | | 4/2006 | Kumagai et al. ........... 280/729 |
| 7,100,944 B2 * | | 9/2006 | Stanley .................... 280/801.1 |
| 2002/0030353 A1 * | | 3/2002 | Braun et al. ................ 280/733 |
| 2003/0062713 A1 * | | 4/2003 | Young et al. ............... 280/736 |
| 2004/0113400 A1 * | | 6/2004 | Weber ...................... 280/730.2 |
| 2004/0163872 A1 * | | 8/2004 | Lincoln et al. ............. 180/271 |
| 2007/0080527 A1 * | | 4/2007 | Itoga et al. ................ 280/733 |
| 2007/0262568 A1 * | | 11/2007 | Itoga et al. ............... 280/728.2 |

FOREIGN PATENT DOCUMENTS

| | | |
|---|---|---|
| EP | 1 371 518 A1 | 12/2003 |
| JP | 05229378 A | 9/1993 |
| JP | 10217818 A | 8/1998 |
| JP | 11165604 A | 6/1999 |
| JP | 11170949 A | 6/1999 |
| JP | 2002079861 A | 3/2002 |
| JP | 2002079862 A | 3/2002 |
| JP | 2002079863 A | 3/2002 |
| JP | 2002145002 | 5/2002 |
| JP | 2002145002 A | 5/2002 |
| JP | 2003312439 A | 11/2003 |
| JP | 2004098753 A | 4/2004 |

* cited by examiner

*Primary Examiner*—Ruth Ilan
*Assistant Examiner*—Timothy Wilhelm
(74) *Attorney, Agent, or Firm*—Fitch, Even, Tabin & Flannery

(57) ABSTRACT

To simplify the mechanism of an occupant protection system in which a seat bag at the front part of a seat cushion and a lap bag are inflated to protect an occupant and also to simplify the mounting structure of the occupant protection system to a seat frame, a holder is mounted to the side frame of a seat. The holder includes a pretensioner connected to a lap anchor, an inflator for inflating a seat bag and a lap bag, and a manifold for distributing gas from the inflator to the seat bag and the lap bag. The connecting structure of the lap anchor and the pretensioner is of a latch type (insert-lock type).

6 Claims, 15 Drawing Sheets

OCCUPANT PROTECTION SYSTEM

FIELD OF THE INVENTION

The present invention relates to an occupant protection system for protecting an occupant of a vehicle such as a car in the event of a collision and, more particularly, it relates to an occupant protection system for preventing the body of the occupant from moving forward during a front collision.

BACKGROUND OF THE INVENTION

As a system for protecting an occupant in the event of a car collision, a system is proposed in which the front part of a seat cushion is pushed up in a car collision to prevent a submarine phenomenon such that the occupant passes under a lap belt during a front crash even with a seatbelt. For example, Japanese Unexamined Patent Application Publication No. 10-217818 describes a vehicle seat in which the front end of the seat cushion is pushed up by an airbag.

It is known in the art to provide an air belt system (inflating seatbelt system) as an occupant protection system (for example, Japanese Unexamined Patent Application Publication No. 2003-312439). In the air belt system of the reference, both of a shoulder belt and a lap belt are inflatable. To the inflatable shoulder belt and lap belt, gas from a gas generator disposed to a buckle is introduced through a tongue. The tongue and the buckle each include a gas supply passage for supplying the gas from the gas generator to the shoulder belt and the lap belt.

Furthermore, Japanese Unexamined Patent Application Publication No. 2002-145002 discloses an occupant protection system in which a seat bag at the front of a seat back, a shoulder belt, and a lap belt are inflated to protect an occupant. The reference shows a structure in which the seat bag at the front of the seat back, the shoulder belt, and the lap belt are inflated by one gas inflator.

In the occupant protection system of Japanese Unexamined Patent Application Publication No. 2002-145002, one end of the inflatable shoulder belt and one end of the inflatable lap belt are joined with different tongues, respectively. The shoulder belt and the lap belt are latched by a buckle unit via the tongues, respectively. The buckle unit and the tongues have gas supply passages for supplying gas from the gas generator to the shoulder belt and the lap belt.

The occupant protection systems disclosed in Japanese Unexamined Patent Application Publication Nos. 2003-312439 and 2002-145002 require a tongue having a gas supply passage, a buckle unit having a gas generator and a passage for introducing gas from the gas generator, and a coupler for detachably joining the tongue-side gas supply passage and the buckle-side gas supply passage, so that the tongue-buckle mechanism is complicated. Also it needs cover means for preventing entry of foreign matter such as dust into the gas supply passage and the gas inlet passage, so that it has a complicated structure.

SUMMARY OF THE INVENTION

Accordingly, it is an object of the present invention to simplify the mechanism of an occupant protection system in which a seat bag at the front of a seat cushion and a lap bag are inflated to protect an occupant. It is another object of the invention to simplify the mounting of the occupant protection system on the seat frame.

An occupant protection system according to one form of the present invention includes an inflatable seat bag disposed inside or under the front part of a seat cushion; a buckle unit; a tongue to be mounted to the buckle unit; a webbing passed through the tongue; a lap anchor for fixing one end of the webbing; retracting means for retracting the other end of the webbing; an inflatable lap bag disposed at the lap portion of the webbing; a gas generator for inflating the seat bag and the lap bag; and a distribution passage for distributing gas from the gas generator to the seat bag and the lap bag, wherein the lap anchor and the gas generator are mounted to a common mounting member.

The occupant protection system according to one form is characterized in that the mounting member includes a connector to which the lap anchor is detachable, the lap anchor being retainable to the connector.

The occupant protection system according to another form is characterized in that the gas distribution passage to the lap bag includes an upstream member and a downstream member, wherein the upstream member is fixed to the mounting member and the downstream member is fixed to the lap anchor; and when the lap anchor is inserted into the connector, the downstream member is brought into engagement with the upstream member.

The occupant protection system according to one form is characterized in that the lap anchor is mounted rotatably to the mounting member.

The occupant protection system according to other forms is characterized by further including a check valve for preventing the backward flow of gas from the seat bag and the lap bag to the gas generator.

The occupant protection system including a check valve preferably is characterized in that the check valve has a flow-rate limiting function of limiting a forward gas flow rate.

The occupant protection system according to other forms is characterized by further including means for limiting a gas flow rate from the gas generator to the seat bag and the lap bag.

An occupant protection system according to another form of the invention includes an inflatable seat bag disposed inside or under the front part of a seat cushion; an inflatable lap bag disposed at the lap portion of the webbing of a seatbelt; a gas generator for inflating the seat bag and the lap bag; and a distribution passage for distributing gas from the gas generator to the seat bag and the lap bag, wherein amounts of gas to be distributed to the seat bag and the lap bag by selecting the diameter of the gas flow channel to the seat bag and the diameter of the gas flow channel to the lap bag.

The occupant protection system according to one form is characterized in that one of the flow channels includes an orifice for controlling the flow rate and the diameter of the gas flow channel is the inside diameter of the orifice.

The occupant protection system according to one form is characterized in that at least part of one of the flow channels is a pipe and the diameter of the gas flow channel is the inside diameter of the pipe.

The occupant protection system according to other forms is characterized by further including a check valve for preventing the backward flow of gas from the seat bag and the lap bag to the gas generator.

The occupant protection system including a check valve preferably is characterized in that the check valve has a flow-rate limiting function of limiting a forward gas flow rate.

In the occupant protection system according to the invention, a gas generator is activated to inflate an airbag in an emergency such as a car collision, so that the front part of the seat cushion is pushed up or a portion in contact with the airbag is pushed from below to be compressed, thus being hardened. This prevents the submarine phenomenon of the occupant and also the lap bag is inflated to restrain the occupant.

In the occupant protection system in one aspect of the invention, the lap-bag gas generator is disposed on the lap-anchor side. Accordingly, there is no need to provide a gas flow channel in the tongue and the buckle and so, a foreign-matter prevent cover for them is not necessary and as such, the structures of the tongue and the buckle are simple. Since the lap anchor and the gas generator are mounted to a common mounting member, the lap anchor and the gas generator can be mounted to a seat frame by mounting the mounting member to the seat frame. This simplifies mounting of the occupant protection system on the seat frame.

In the occupant protection system according to one form, the lap anchor can be separated from the connector. Accordingly, before the mounting member is mounted to the seat frame, the lap anchor can be disengaged from the connector. In that case, when also the lap belt can be separated from the gas generator, the lap belt, the connector, and the mounting member can be separated and as such, only the connector and the mounting member can be mounted to the seat frame. Since the lap belt is not connected, the connector and the mounting member can easily be mounted.

To allow also the lap belt to be separated from the gas generator, it is preferable to have structure so that when the lap anchor is drawn out from the connector, the downstream member is separated from the upstream member. When the lap anchor is inserted into the connector, the downstream member and the upstream member are joined together, allowing gas to be circulated from the upstream member to the downstream member.

As in one preferred form, when the lap anchor is rotatably mounted to the mounting member, the lap anchor rotates with or following the size and motion of the body of the occupant. This reduces a stress applied to the lap-anchor mounting member of the lap belt.

As in another preferred form, when a check valve is provided for preventing the backward flow of gas from the seat bag and the lap bag to the gas generator, the inner pressure of the inflated seat bag and lap bag can be maintained high for a long time.

In that case, by providing a flow-rate limiting function to the check valve for limiting a forward gas flow rate, an appropriate amount of gas can be supplied to the lap bag and the seat bag.

The flow-rate limiting function may be provided in a portion other than the check valve.

The occupant protection system according to one form is constructed to control the amounts of gas to be distributed to the seat bag and the lap bag by selecting the diameters of the flow channels to the seat bag and the lap bag. This facilitates the control of the gas distribution amount.

In that case, by providing a flow-rate control orifice in at least one channel, as in one preferred form, the amounts of gas to be distributed to the seat bag and the lap bag can be controlled very easily only by selecting the opening diameter of the orifice.

Since at least part of at least one of the channels is a pipe, in one form, the amounts of gas to be distributed to the seat bag and the lap bag can be controlled very easily only by selecting the inside diameter of the pipe. In that case, when a flow-rate control orifice is provided in at least one channel, the gas distribution amount can be controlled more precisely by selecting both the inside diameter of the pipe and the opening diameter of the orifice.

Since a check valve for preventing the backward flow of gas from the seat bag and the lap bag to the gas generator is provided as in another form, the inner pressure of the inflated bags can be maintained high for a long time.

In that case, the amounts of gas to be distributed to the bags may be controlled by providing the check valve with a flow-rate limiting function of limiting a forward gas flow rate.

DETAILED DESCRIPTION OF THE PREFERRED EMBODIMENTS

Embodiments of the present invention will be described with reference to the drawings.

Figure 1:
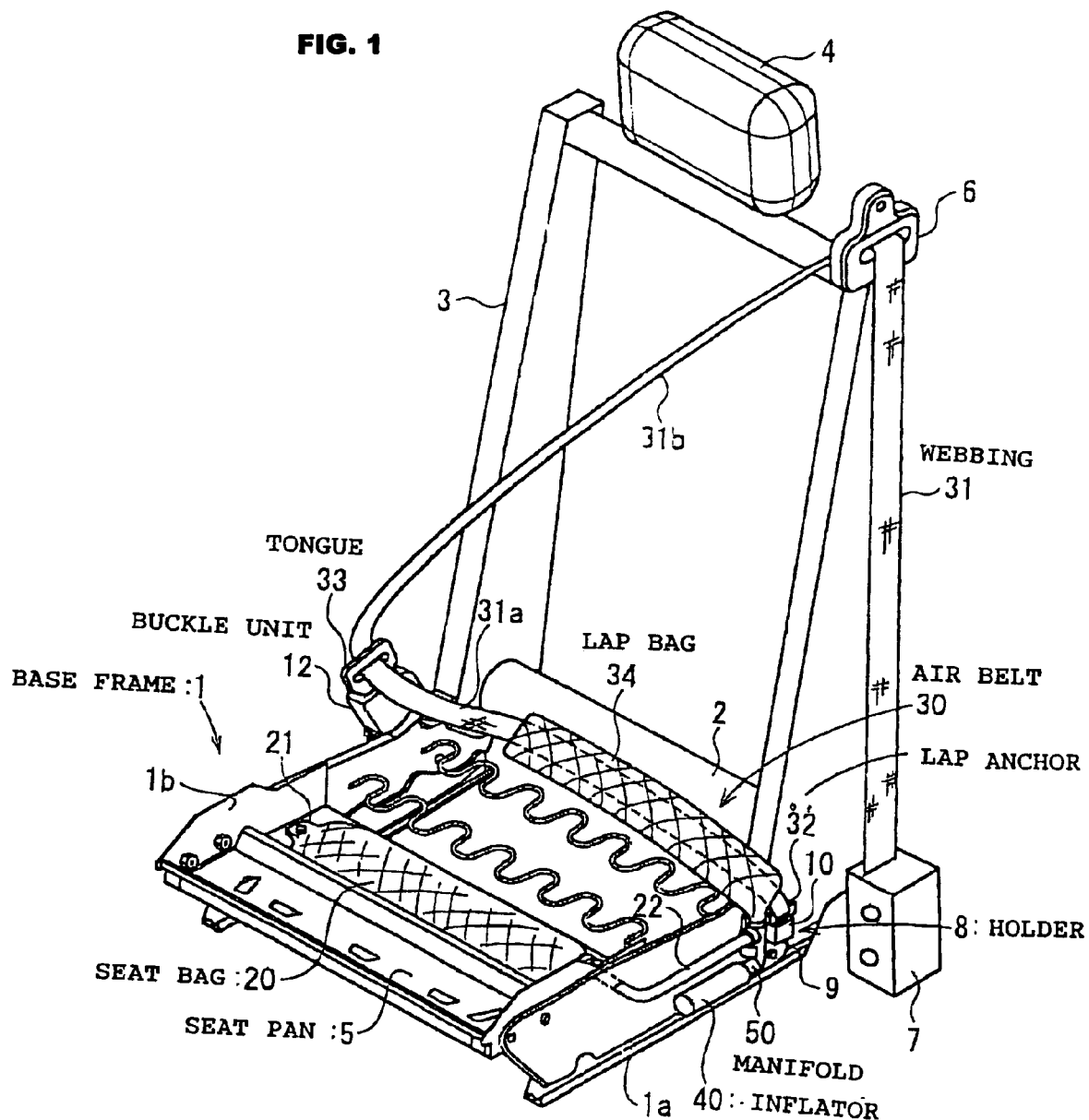
FIG. 1 is a perspective view of the frame of a seat including an occupant protection system according to an embodiment of the present invention.
Figure 2:
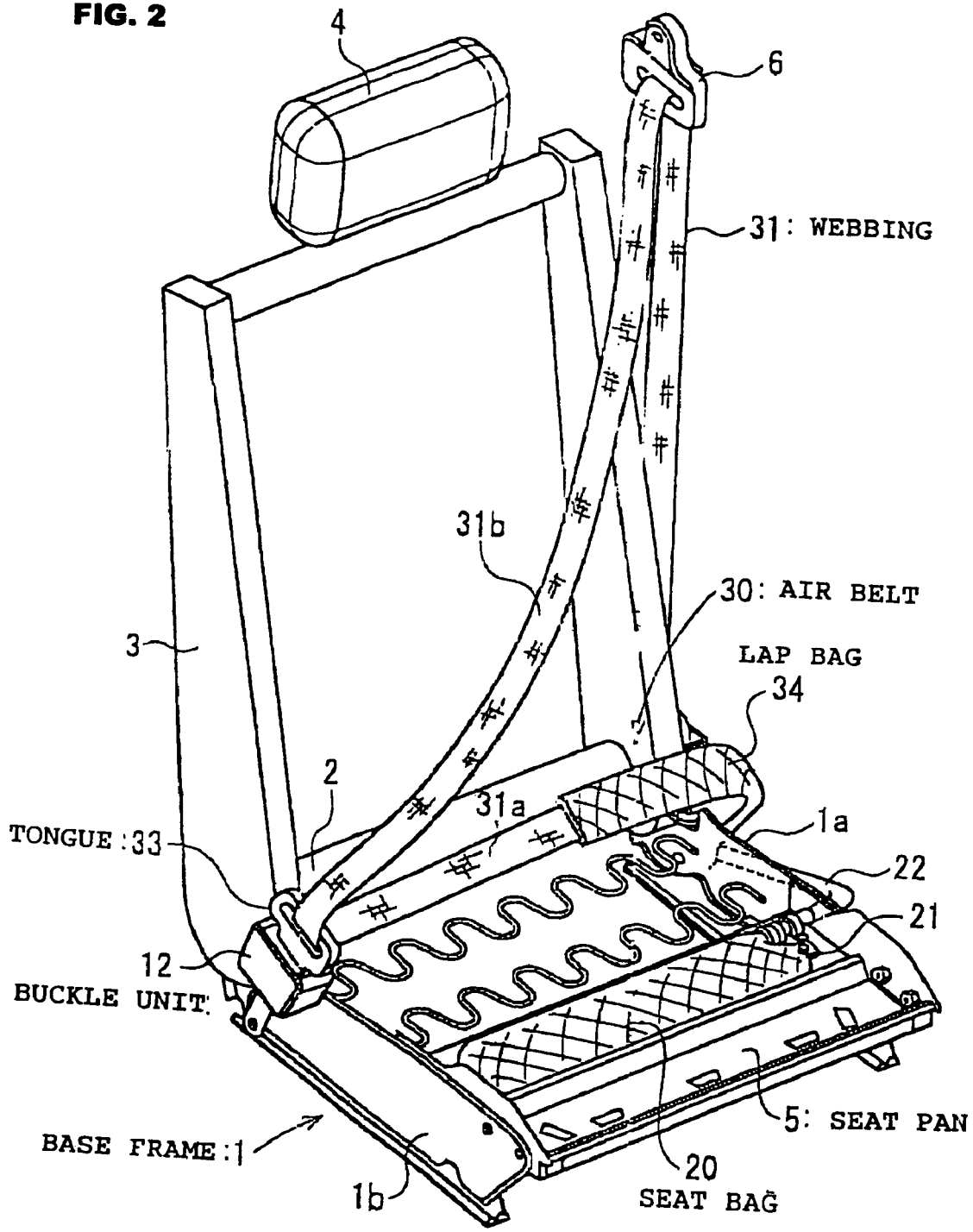
FIG. 2 is a perspective view of the frame of the seat including the occupant protection system according to the embodiment.
Figure 3:
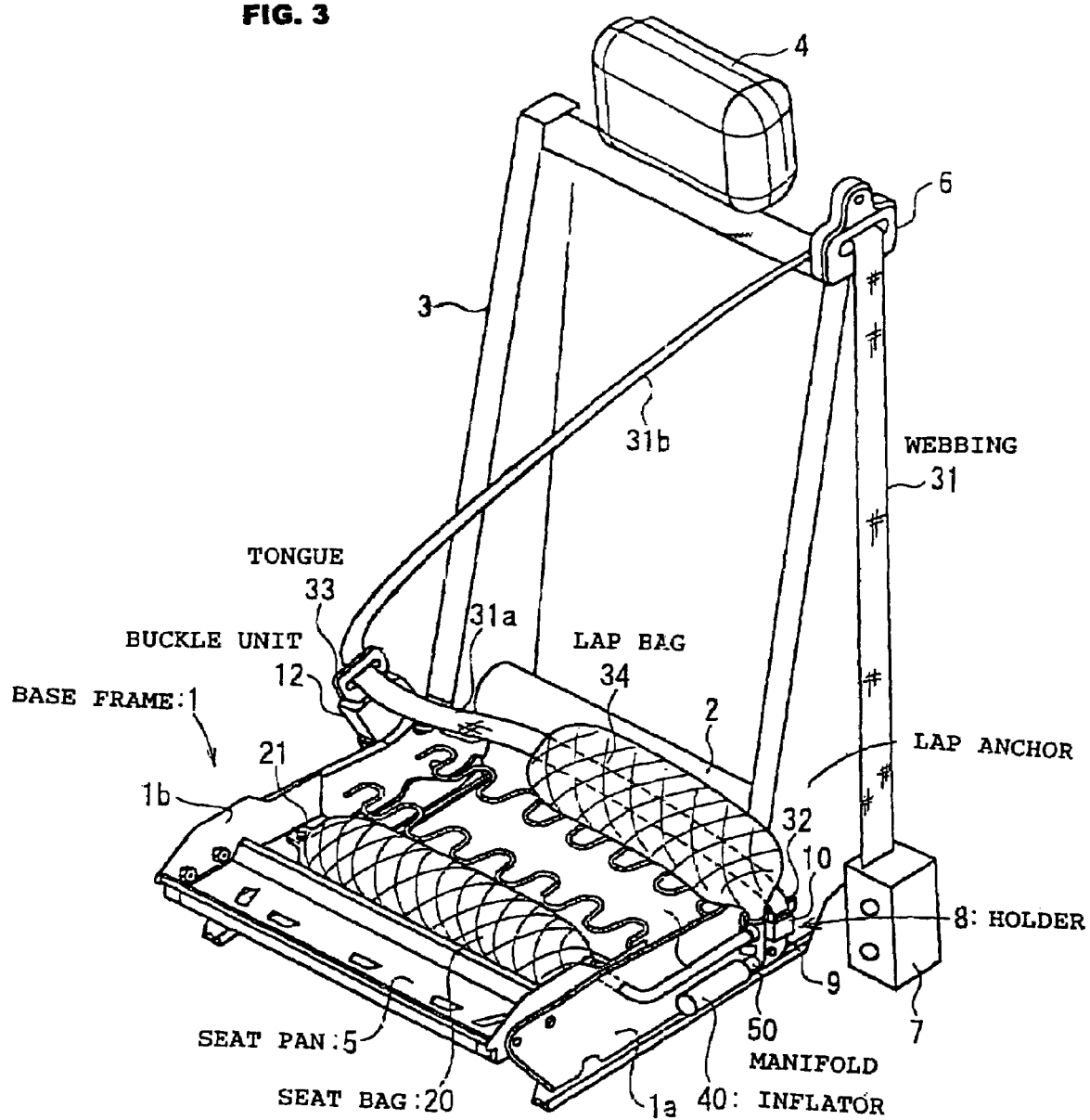
FIG. 3 is a perspective view of the frame of the seat including the occupant protection system according to the embodiment.
Figure 4:
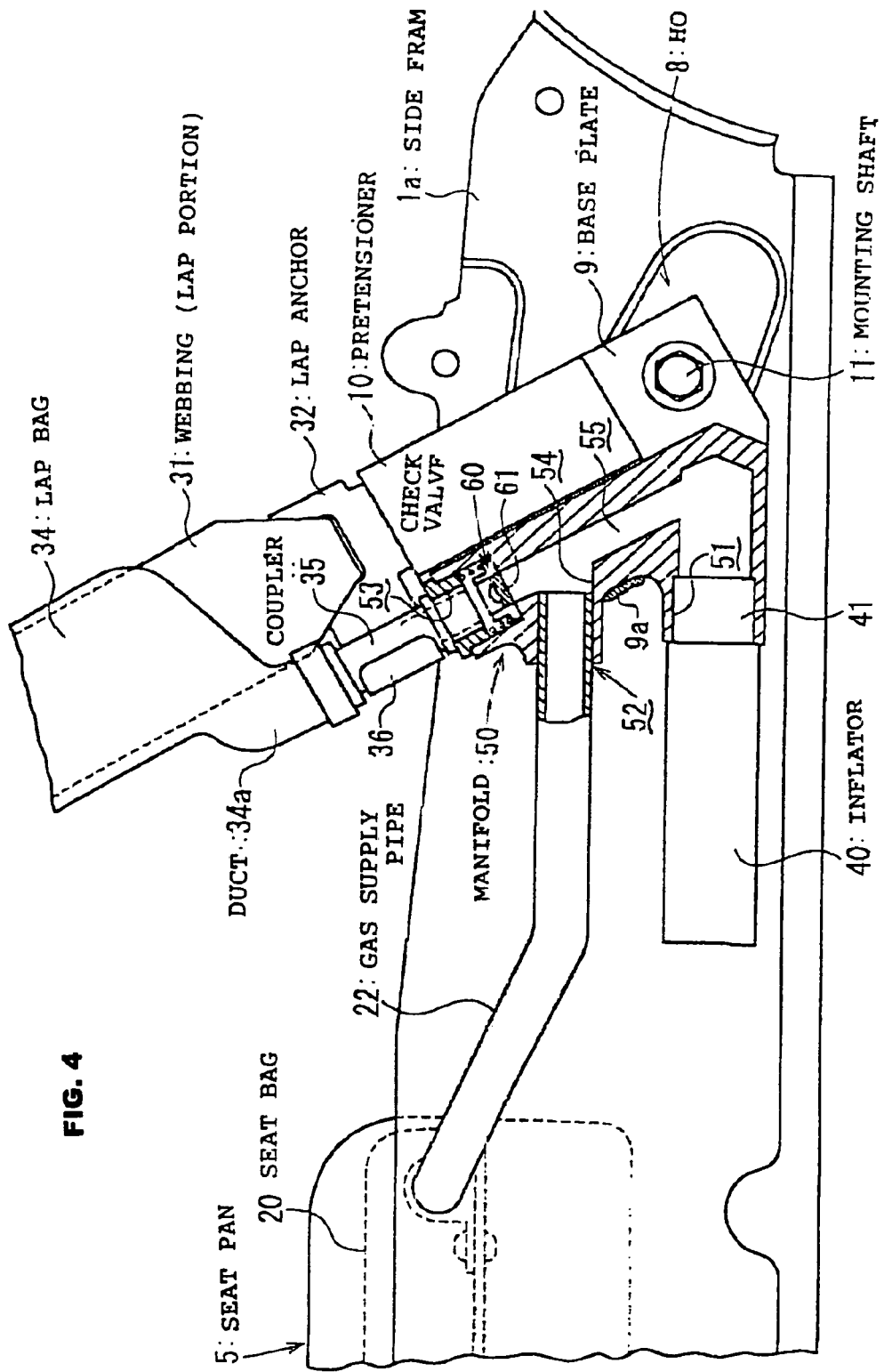
FIG. 4 is a side view (partially in section) of an essential part of the occupant protection system.
Figure 5A:
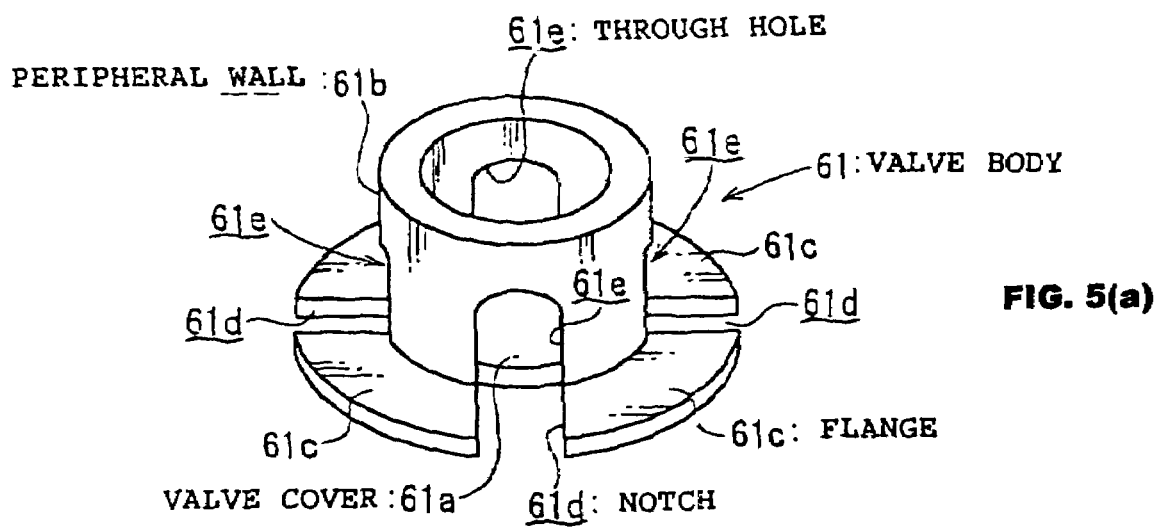
FIGS. 5(a) and 5(b) are perspective views of the valve body of a check valve.
Figure 6A:
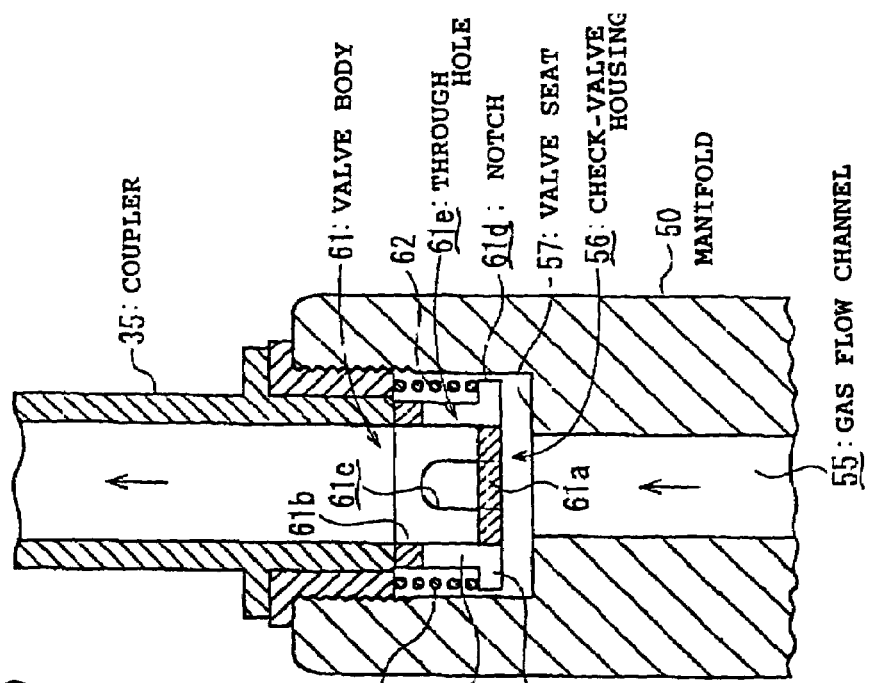
FIGS. 6(a) and 6(b) are sectional views showing the operation of the check valve.

FIGS. 1 to 3 are perspective views of the frame of a car seat including an occupant protection system according to an embodiment of the present invention, in which FIGS. 1 and 2 show a seat bag and a lap bag in an uninflated state and FIG. 3 shows the seat bag and the lap bag in an inflated state. FIG. 4 is a side view (partially in sectional) of an essential part of the occupant protection system. FIGS. 5(a) and (b) are perspective views of the valve body of a check valve of the occupant protection system, as viewed from the upper stream and the lower stream of the gas flow channel, respectively. FIGS. 6(a) and (b) are vertical sections of the check valve with the gas flow channel closed and opened, respectively.

The frame of a car seat includes a base frame 1 and a back frame 3 rotatably joined to the base frame 1 via a support shaft 2 and a reclining device (not shown). A headrest 4 is mounted to the upper part of the back frame 3.

The base frame 1 includes left and right side frames 1a and 1b and a seat pan 5 disposed between the front parts of the side frames 1a and 1b.

An inflatable seat bag 20 is disposed on the seat pan 5. The seat bag 20 extends along the width of the seat. The seat bag 20 has auriform locking pieces 21 and 21 at the longitudinally (laterally) opposite ends. The locking pieces 21 and 21 are fixed to the seat pan 5 with bolts (not shown).

Although not shown, the seat bag 20 includes a bag body which is folded in a long shape and a cylindrical mesh webbing which surrounds the folded bag body. The mesh webbing is constructed of a woven fabric which extends freely in the radial direction but hardly extends lengthwise (along the width of the seat).

The seat bag 20 (the bag body) has a gas inlet (not shown) at one end of the length thereof (adjacent to the side frame 1a in this embodiment). To the gas inlet, a gas supply pipe 22 extending from an inflator 40, to be described later, is connected. As shown in FIGS. 1 and 3, the gas supply pipe 22 is disposed along the outer side of the side frame 1a.

A webbing 31 of an air belt (inflatable seatbelt) 30 is routed around the front surface of the back frame 3. The webbing 31 is made of a general uninflatable belt material. The webbing 31 has a lap anchor 32 mounted to one end thereof. The middle of the webbing 31 is passed through the through anchor (not shown) of a tongue 33. The other end of the webbing 31 is passed through a shoulder anchor 6 provided at the upper part of the side (the pillar etc.) of the vehicle cabin and connected to a seat-belt retractor 7 such that it can be retracted.

The lap anchor 32 is fixed to a holder 8 serving as a lap-anchor and inflator mounting member, provided to the base frame 1 adjacent to the side of the vehicle cabin (on the outer side of the side frame 1a). The base plate 9 of the holder 8 has a pretensioner 10 also serving as a lap-anchor connector, to which the lap anchor 32 is connected. The pretensioner 10 pulls down the lap anchor 32 to strain the webbing 31 in an emergency such as a car collision. The base plate 9 is mounted to the side frame 1a such that it can rotate to and fro via a mounting shaft 11.

According to the embodiment, the joint structure of the lap anchor 32 to the pretensioner 10 is of a latch type (insert-lock type). Specifically, the lap anchor 32 has a latch plate which is to be inserted into the lap-anchor insertion hole of the pretensioner 10 at the end. The pretensioner 10 latches the latch plate inserted into the lap-anchor insertion hole with a latch claw (not shown), thereby retaining the lap anchor 32.

The base frame 1 has, adjacent to the center of the vehicle cabin (on the outer side of the side frame 1b in this embodiment), a buckle unit 12 to which the tongue 33 is detachably joined. The webbing 31 is composed of a lap portion 31a and a shoulder portion 31b, with the tongue 33 joined with the buckle unit 12. The lap portion 31a is routed from the tongue 33 to the lap anchor 32 along the front surface of the waist over stomach of an occupant sitting in the seat. The shoulder portion 31b is routed from the tongue 33 to the shoulder anchor 6 along the front surface of the upper half of the occupant.

An inflatable lap bag 34 is disposed along the lap portion 31a.

The lap bag 34 is composed of an inflatable bag body arranged along the lap portion 31a and a cylindrical cover which covers the bag body and the lap portion 31a, which are not shown. The bag body is normally folded into a long and flat state along the lap portion 31a. The cover, in this embodiment, has a size that fits the outer periphery of the folded bag body in an uninflated state and, when the bag body inflates, it extends in the circumferential direction to allow the bag body to inflate.

In this embodiment, the cover is constructed of a woven fabric similar to the mesh webbing of the seat bag 20 which extends freely in the circumferential direction but hardly extends along the length (in the direction that the lap portion 31a extends). Therefore, when the bag body inflates, the mesh of the cover expands in the circumferential direction as the cover extends in the circumferential direction, resulting in a decrease in the length of the cover. Thus, the webbing 31 becomes tight to come into close contact with the body of an occupant.

The lap bag 34 (bag body) has a gas-inlet duct 34a at the end adjacent to the lap anchor 32. In this embodiment, a tubular coupler 35, which is fitted in a lap-bag gas outlet (gas port) 53 of a manifold 50, to be described later, is mounted to the end of the duct 34a. The coupler 35 is retained to the lap anchor 32 with a hook-like fixing member 36 of the lap anchor 32.

The coupler 35 extends such that the axial direction agrees with the direction that the latch plate is inserted into the lap-anchor entry.

As shown in FIG. 4, the base plate 9 of the holder 8 includes a pretensioner 10, an inflator (gas generator) 40 for inflating the seat bag 20 and the lap bag 34, and the manifold 50 serving as a gas flow channel for distributing the gas from the inflator 40 into the seat bag 20 and the lap bag 34. Reference numeral 9a denotes a fixing member for fixing the manifold 50 to the base plate 9. The inflator 40 is fixed to the base plate 9 via the manifold 50.

As shown in FIG. 4, the manifold 50 includes one gas inlet 51 connected to the gas port 41 of the inflator 40, two respective gas outlets 52 and 53 for the seat bag 20 and the lap bag 34, gas flow channels 54 and 55 that communicate the gas inlet 51 with the seat-bag gas outlet 52 and the lap-bag gas outlet 53, and a check valve 60 disposed on the upper stream of the lap-bag gas outlet 53 for preventing backward flow of gas from the lap bag 34 to the gas flow channel 55.

As shown in the drawing, the gas flow channel 55, in this embodiment, extends substantially vertically along the front rim of the base plate 9 of the holder 8. The lap-bag gas outlet 53 is disposed at the upper end of the gas flow channel 55. The lower end of the gas flow channel 55 is bent forward along the outer side of the side frame 1a, at the end of which the gas inlet 51 is provided. The gas flow channel 54 branches off forward from the middle of the gas flow channel 55 along the outer side of the side frame 1a and has the seat-bag gas outlet 52 at the end.

According to the embodiment, the lap-bag gas outlet 53 is open to the same direction as that of the lap-anchor insertion hole of the pretensioner 10 and is disposed such that when the latch plate is inserted into the lap-anchor insertion hole to join the lap anchor 32 with the pretensioner 10, the coupler 35 retained by the lap anchor 32 is fitted in the lap-bag gas outlet 53. Briefly, the embodiment is constructed such that when the lap anchor 32 is joined with the pretensioner 10, the gas-inlet duct 34a and the gas flow channel 55 for the lap bag 34 are connected so as to allow gas circulation through the coupler 35.

To the seat-bag gas outlet 52, one end of the gas supply pipe 22 to the seat bag 20 is connected. The gas supply pipe 22 is disposed along the outer side of the side frame 1a, the other end of which is connected to the gas inlet of the seat bag 20.

The inflator 40 has a substantially cylindrical casing, at one longitudinal end of which the gas port 41 is provided. In this embodiment, as shown in the drawing, the inflator 40 is disposed along the outer side of the side frame 1a such that the length is directed lengthwise, of which the gas port 41 is connected to the gas inlet 51 of the manifold 50.

Figure 6B:
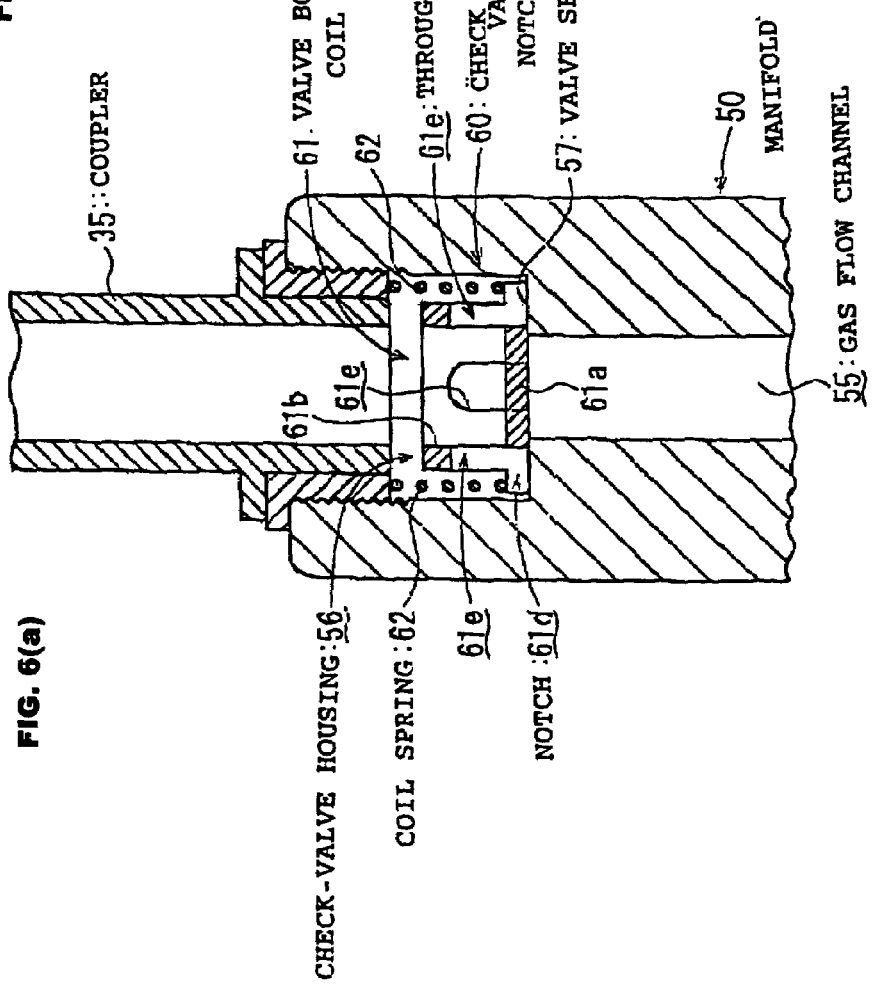

As shown in FIGS. 6(a) and 6(b), a check-valve housing 56 is provided on the upper stream of the lap-bag gas outlet 53. The check-valve housing 56 is a chamber in which the diameter of the middle of the gas flow channel 55 is increased. The surface of the step between the check-valve housing 56 and the upstream gas flow channel 55 serves as a valve seat 57 on which the body 61 of the check valve 60 is placed.

The check valve 60 includes the valve body 61 housed in the check-valve housing 56 and a coil spring 62 which urges the valve body 61 toward the valve seat 57.

The valve body 61 includes a valve cover 61a which is placed on the valve seat 57 to close the gas flow channel 55, a substantially cylindrical peripheral wall 61b upstanding from the outer periphery of the valve cover 61a downstream, a flange 61c projecting radially from the side circumference of the base (the upper stream) of the peripheral wall 61b flush with the valve cover 61a, a notch 61d that is cut off from the outer periphery of the flange 61c to the base of the peripheral wall 61b, and a through hole 61e formed in the side circumference of the peripheral wall 61b. The through hole 61e communicates with the notch 61d at the base of the peripheral wall 61b. In this embodiment, the notch 61d and the through hole 61e are disposed four at regular intervals around the circumference of the peripheral wall 61b (and the flange 61c).

The coil spring 62 is disposed around the peripheral wall 61b such that one end is in contact with the flange 61c and the other end is in contact with the surface of the step between the check-valve housing 56 and the downstream lap-bag gas outlet 53, in a power-stored condition.

As shown in FIGS. 6(a) and 6(b), the end face of the coupler 35 fitted in the lap-bag gas outlet 53 is substantially flush with the step surface. The diameter (inside diameter) of the peripheral wall 61b is substantially equal to that of the end face of the coupler 35. When the valve body 61 moves from the valve seat 57 downstream, the end faces of the peripheral wall 61b and the coupler 35 are brought into contact with each other around the entire circumference, as shown in FIG. 6(b), to communicate the inner spaces thereof with each other.

When the inflator 40 has not emitted a jet of gas, the valve body 61 of the check valve 60 is placed on the valve seat 57 by the urging force of the coil spring 62 to close the gas flow channel 55 with the valve cover 61a of the valve body 61. When the inflator 40 has emitted a jet of gas, the valve body 61 (the valve cover 61a) is separated from the valve seat 57 against the urging force of the coil spring 62 by the pressure of gas applied from the inflator 40 into the gas flow channel 55, thereby opening the gas flow channel 55. Thus, the gas flows from the gas flow channel 55 through the check-valve housing 56 into the coupler 35 and as such, the lap bag 34 is supplied with the gas.

At that time, as the pressure of the gas flowing from the inflator 40 into the gas flow channel 55 increases, the valve body 61 moves downstream to bring the end of the peripheral wall 61b of the valve body 61 close to the end face of the coupler 35, thus limiting the amount of the gas flowing into the coupler 35. When the gas pressure has exceeded a specified value, the end faces of the peripheral wall 61b and the coupler 35 come into contact with each other, so that only the gas flowing into the inner space of the peripheral wall 61b is introduced into the coupler 35 through the notch 61d of the flange 61c and the through hole 61e of the peripheral wall 61b of the valve body 61. This prevents excessive gas to be supplied to the lap bag 34.

In installation of this occupant protection system, the pretensioner 10, the manifold 50, and the inflator 40 connected to the gas inlet 51 of the manifold 50 are first mounted to the base plate 9, and then the base plate 9 is mounted to the outer side of the side frame 1a with the mounting shaft 11. The seat bag 20 is disposed on the seat pan 5. One end of the gas supply pipe 22 is joined with the gas inlet of the seat bag 20, while the other end is joined with the seat-bag gas outlet 52 of the manifold 50.

On the other hand, the air belt 30 is mounted in the car body (in the cabin). The webbing 31 is passed through the tongue 33 and the shoulder anchor 6 such that the end of the webbing 31 adjacent to the shoulder portion 31b is connected to the seat-belt retractor 7 so as to be retracted.

The lap anchor 32 at the end of the webbing 31 adjacent to the lap portion 31a is joined with the pretensioner 10 of the holder 8. At that time, the coupler 35 retained by the lap anchor 32 is fitted into the lap-bag gas outlet 53 of the manifold 50, so that the duct 34a for introducing gas to the lap bag 34 and the gas flow channel 55 are communicated with each other via the coupler 35.

The occupant protection system is constructed such that the joint structure of the lap anchor 32 to the pretensioner 10 is of a latch type (insert-lock type) and, when the lap anchor 32 is joined with the pretensioner 10, the gas flow channel 55 of the manifold 50 and the duct 34a for introducing gas to the lap bag 34 are communicated with each other via the coupler 35. This facilitates connection between the lap anchor 32 and the pretensioner 10 and the connection between the gas flow channel 55 and the duct 34a. Since the holder 8 is separated from the lap anchor 32, the air belt 30 can easily be mounted to the vehicle body and the holder 8 can also be mounted easily to the side frame 1a.

Particularly, the occupant protection system is constructed such that the pretensioner 10 serving as the connector for the lap anchor 32, the inflator 40, and the manifold 50 are mounted to the base plate 9 of the holder 8. Accordingly, by mounting the base plate 9 to the side frame 1a, also the pretensioner 10, the inflator 40, and the manifold 50 can be mounted to the side frame 1a. This makes it efficient to mount them.

The operation of the occupant protection system will then be described.

In an emergency such as a car collision, the inflator 40 emits a jet of gas and the pretensioner 10 pulls the lap anchor 32 downward. The gas from the inflator 40 is distributed from the gas inlet 51 into the gas flow channels 54 and 55 and supplied to the seat bag 20 and the lap bag 34 through the seat-bag gas outlet 52 and the lap-bag gas outlet 53, respectively. Thus, the seat bag 20 and the lap bag 34 are inflated by the gas from the common inflator 40.

The seat bag 20 then inflates under the seat cushion to push the seat cushion upward. Accordingly, the front of the seat cushion is pushed up or hardened to prevent the forward movement of the waist of the occupant.

Since the pretensioner 10 pushes down the lap anchor 32 and the lap bag 34 is decreased in length as it inflates, the entire air belt 30 (the webbing 31) becomes tight to come into close contact with the body of the occupant. As a result, the femoral region across the waist of the occupant are firmly restrained by the nipping effect of the air belt 30 and the front of the seat cushion which has been pushed up or hardened by the seat bag 20. At that time, the inflated lap bag 34 absorbs the impact to the waist over the stomach of the occupant.

In the embodiment, since the manifold 50 includes the check valve 60, the backward flow of gas from the inflated lap bag 34 into the gas flow channel 55 of the manifold 50 is prevented, so that the inner pressure of the lap bag 34 can be held high for a long time.

In the embodiment, the check valve 60 has a flow-rate limiting function of limiting the flow rate of the gas supplied from the gas flow channel 55 into the lap bag 34, so that the lap bag 34 is supplied with a correct amount of gas.

Since the occupant protection system is constructed such that the seat back 20 and the lap back 34 are inflated by the common inflator 40 as has been described, only one inflator is good enough, thus having a simple structure.

The occupant protection system is constructed such that the inflator 40 and the gas supply passage from the inflator 40 to the lap bag 34 are disposed to the lap anchor 32. Accordingly, there is no need to provide a gas flow channel to the tongue 33 and the buckle unit 12 and also a cover to prevent entry of foreign matter, thus simplifying the structure of the tongue 33 and the buckle unit 12.

It is to be understood that the structure of the check valve of the invention is not limited to the foregoing.

Figure 7A:
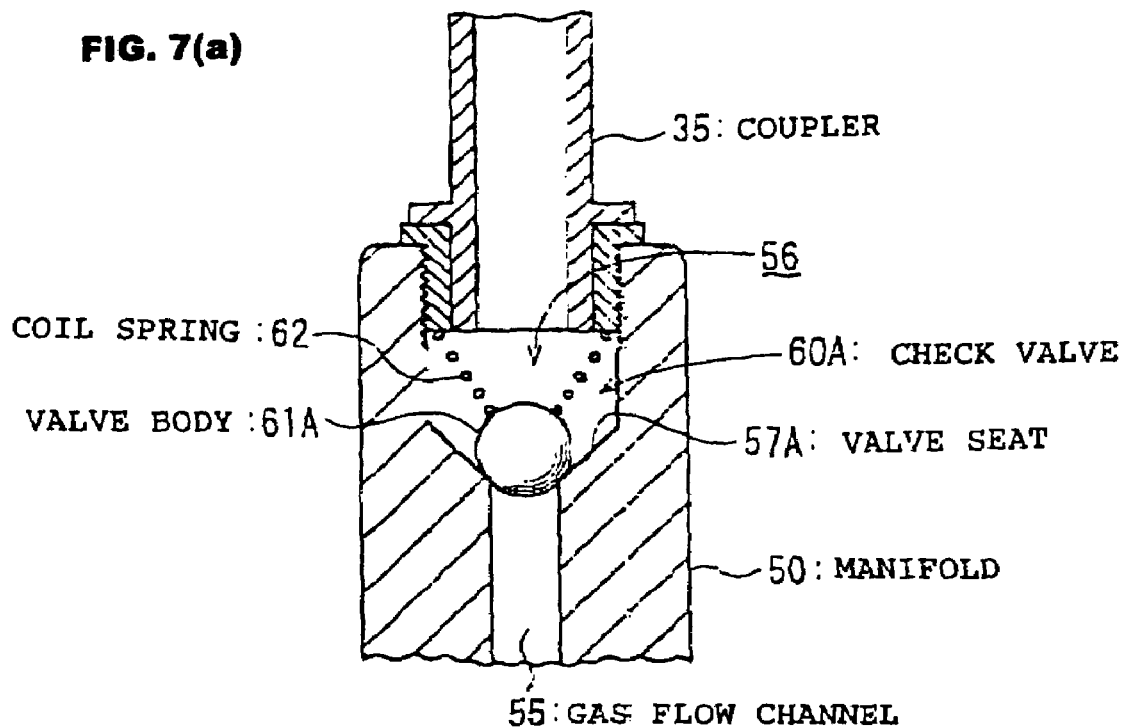
FIGS. 7(a) and 7(b) are sectional views of another structural example of the check valve.

FIGS. 7(a) and (b) are sectional views of different structural examples of the check valve.

A check valve 60A in FIG. 7(a) has a circular valve body 61A. A valve seat 57A on which the valve body 61A is placed has a tapered surface expanding from the gas flow channel 55 downstream. Reference numeral 62 denotes a coil spring that urges the valve body 61A to the valve seat 57A.

Figure 7B:
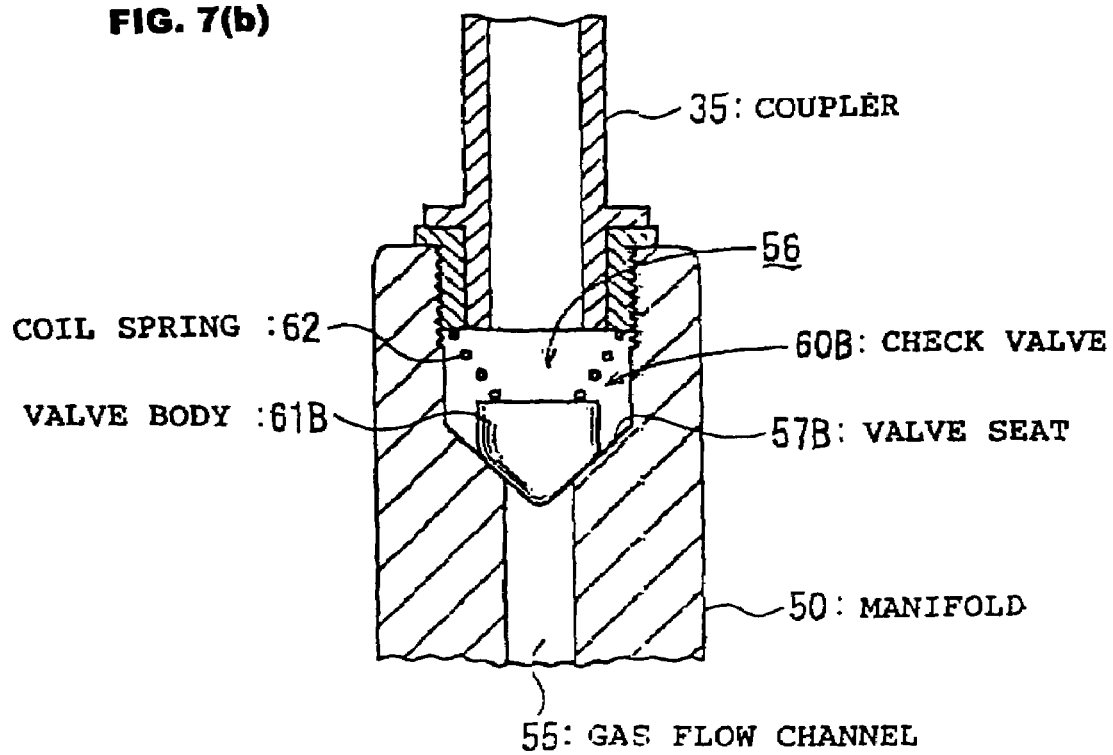

When the inflator 40 (not shown in FIGS. 7(a) and 7(b)) has not emitted a jet of gas, the valve body 61A of the check valve 60A is brought into close contact with the tapered surface of the valve seat 57A by the urging force of the coil spring 62 to close the gas flow channel 55. When the inflator 40 has emitted a jet of gas, the valve body 61A is separated from the valve seat 57A against the urging force of the coil spring 62 by the pressure of gas applied from the inflator 40, thereby opening the gas flow channel 55.

The check valve 60B in FIG. 7(b) includes a substantially truncated-cone-shaped valve body 61B having a tapered surface which is tapered upstream. A valve seat 57B of this embodiment has also a tapered surface expanding from the gas flow channel 55 downstream. When the inflator 40 has not emitted a jet of gas, the tapered surfaces of the valve body 61B and the valve seat 57B are brought into close contact with each other by the urging force of the coil spring 62 to close the gas flow channel 55. When the inflator 40 has emitted a jet of gas, the tapered surfaces of the valve body 61B and the valve seat 57B are separated from each other against the urging force of the coil spring 62 by the pressure of gas applied from the inflator 40, thereby opening the gas flow channel 55.

The other structures of the embodiments of FIGS. 7(a) and (b) are the same as those of the embodiment of FIGS. 1 to 6(b) and the same reference numerals of FIG. 7 as those of FIGS. 1 to 6(b) denote the same components.

It is to be understood that the distribution passage (manifold) of the invention which distributes the gas from the inflator into the seat bag and the lap bag is not limited to the structure of FIGS. 1 to 6(b).

Figure 8A:
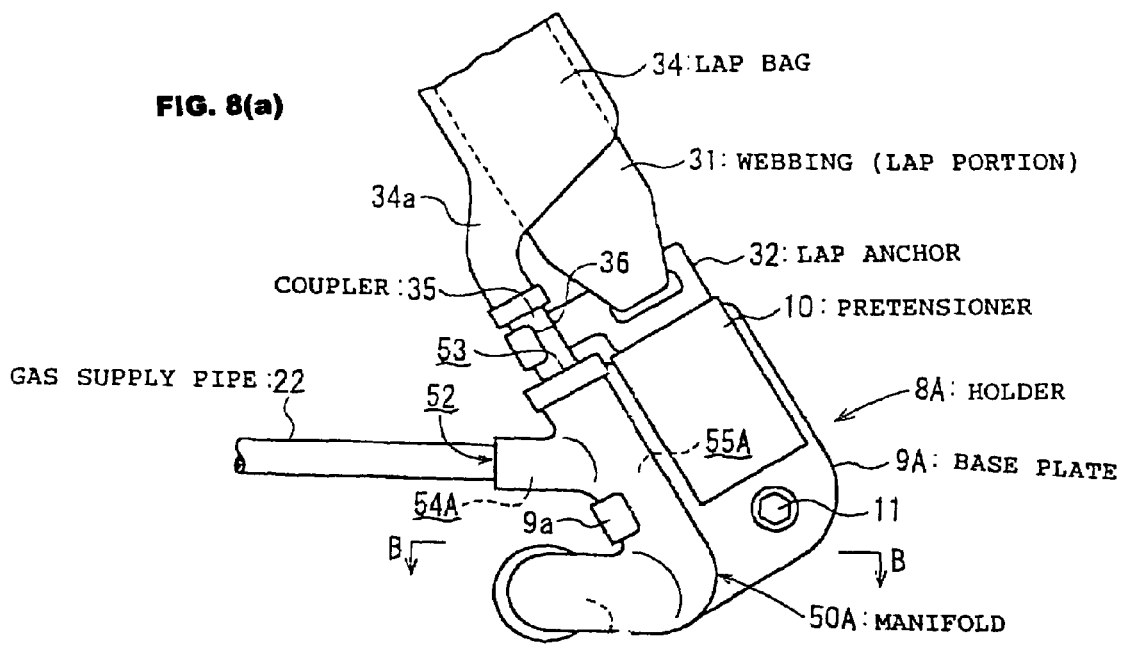
FIGS. 8(a) and 8(b) are explanatory diagrams of another structural example of a manifold serving as a distribution passage.
Figure 8B:
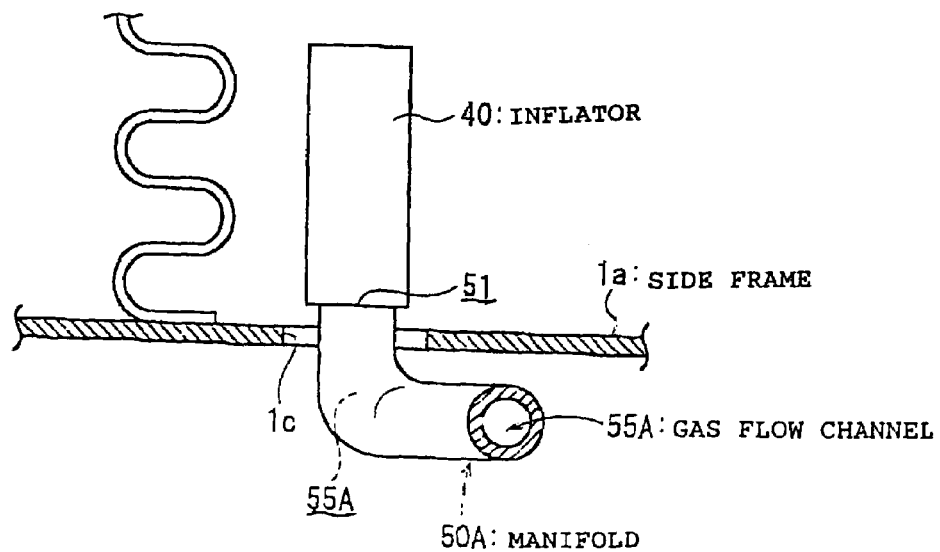

FIG. 8(a) is a side view of another structural example of an essential part of a distribution passage (manifold). FIG. 8(b) is a sectional view taken along line B-B of FIG. 8(a).

Also in the embodiment of FIGS. 8(a) and 8(b), the base plate 9A of a holder 8A serving as a lap-anchor- and inflator-mounting member has a manifold 50A acting as distribution passage. The gas from the inflator 40 is distributed to the seat bag 20 (not shown in FIGS. 8(a) and 8(b)) and the lap bag 34 through the manifold 50A.

The manifold 50A includes, as with the manifold 50 of FIGS. 1 to 6, the one gas inlet 51 connected to the gas port of the inflator 40, the two respective gas outlets 52 and 53 for the seat bag 20 and the lap bag 34, and gas flow channels 54A and 55A that communicate the gas inlet 51 with the seat-bag gas outlet 52 and the lap-bag gas outlet 53.

In this embodiment, the gas flow channel 55A extends vertically along the front rim of the base plate 9A of the holder 8A. The lower end of the gas flow channel 55A is bent toward the side frame 1a substantially at right angles. The gas inlet 51 is disposed at the end of the portion bent toward the side frame 1a such that it opens to the side frame 1a. The inflator 40 is connected to the gas inlet 51, with the length directed to the center of the seat (the center of the lateral width).

In this embodiment, the side frame 1a has an inflator receiving port 1c for receiving the inflator 40. The inflator 40 connected to the gas inlet 51 is disposed in the space between the side frames 1a and 1b (under the seat cushion) through the inflator receiving port 1c.

Also in this embodiment, the lap-bag gas outlet 53 is disposed at the upper end of the gas flow channel 55A. The gas flow channel 54A branches off forward from the middle of the gas flow channel 55A (the middle of the portion extending vertically along the front rim of the base plate 9A) along the outer side of the side frame 1a. The seat-bag gas outlet 52 is disposed at the end of the gas flow channel 54A.

It is to be understood that the structure of the gas flow channel of the manifold serving as distribution passage is not limited to the foregoing.

Figure 9:
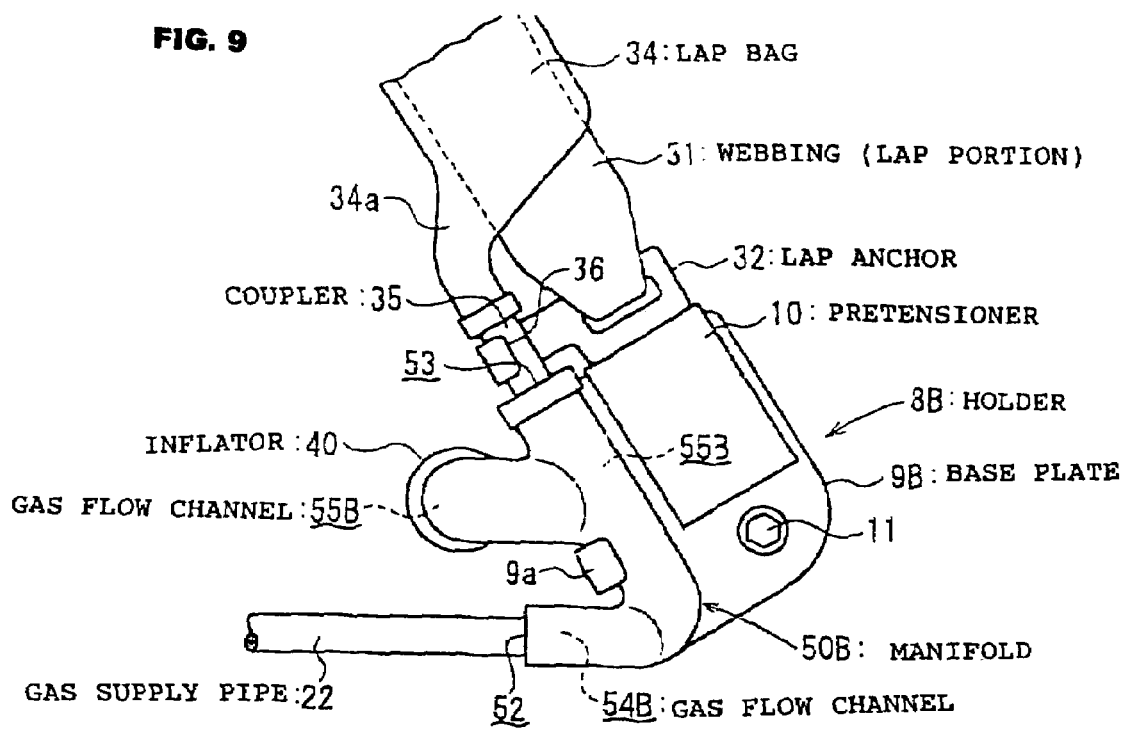
FIG. 9 is an explanatory diagram of another structural example of the manifold serving as a distribution passage.
Figure 10:
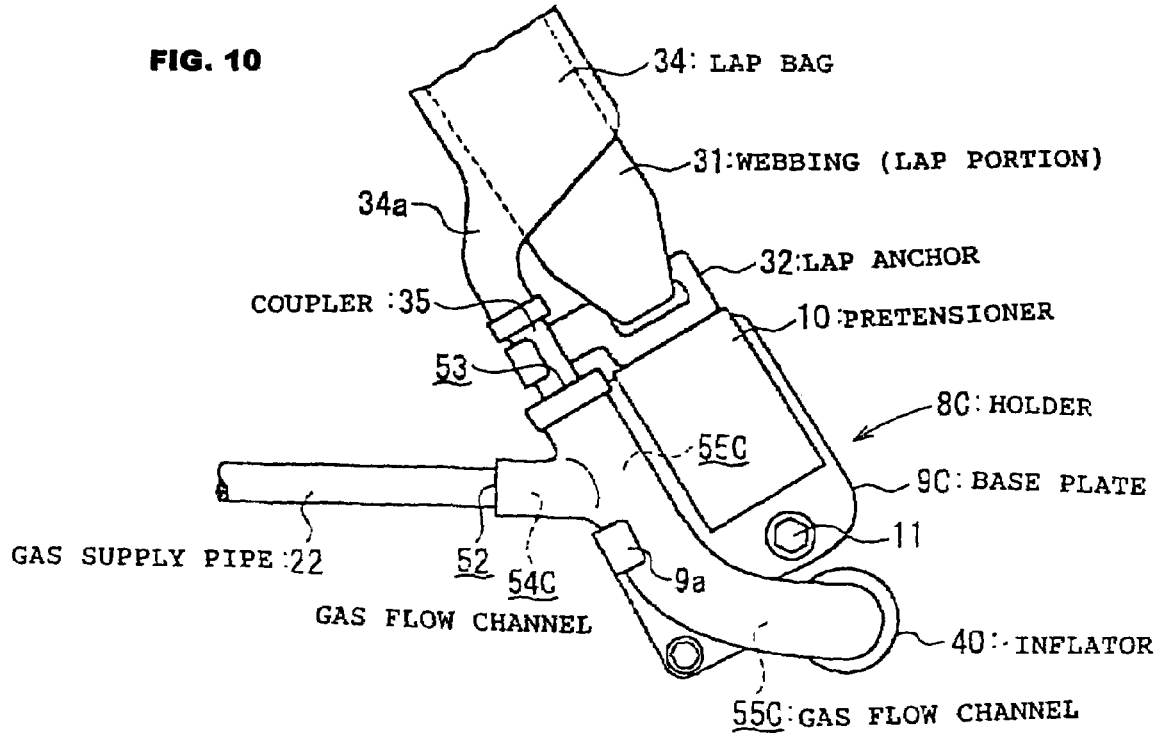
FIG. 10 is an explanatory diagram of another structural example of the manifold serving as a distribution passage.

FIGS. 9 and 10 are side views of other structural examples of the gas flow channel.

A manifold 50B of FIG. 9, serving as distribution passage, is constructed such that a gas flow channel 54B extends substantially vertically along the front rim of the base plate 9B of a holder 8B, which serves as lap-anchor- and inflator-mounting member, and a gas flow channel 55B branches off forward from the middle of the gas flow channel 54B along the outer side of the side frame 1a (not shown in FIG. 9). In this embodiment, the lap-bag gas outlet 53 is disposed at the upper end of the gas flow channel 55B and the seat-bag gas outlet 52 is disposed at the lower end. A gas inlet (not shown) to which the gas port of the inflator 40 is connected is provided at the end of the gas flow channel 55B.

As shown in the drawing, the lower end of the gas flow channel 54B is bent forward along the outer side of the side frame 1a, at the end of which the seat-bag gas outlet 52 is open forward. Also in this embodiment, the gas supply pipe 22 for the seat bag 20 (not shown in FIG. 9) is connected to the seat-bag gas outlet 52.

Also in this embodiment, the gas flow channel 55B is bent at the middle toward the side frame 1a, at the end of which the gas inlet is open to the side frame 1a. The inflator 40 is connected to the gas inlet, with the length directed to the center of the seat and is disposed under the seat cushion via an inflator receiving port (not shown) of the side frame 1a.

A manifold 50C of FIG. 10, serving as distribution passage, is constructed such that the upper end of a gas flow channel 54c extends substantially vertically along the front rim of the base plate 9C of a holder 8C, which serves as lap-anchor and inflator mounting member, while the lower end continued therefrom changes its extending direction in the middle along the outer side of the side frame 1a (not shown in FIG. 10) and extends underneath the back frame 3 (not shown in FIG. 10). The lower end of the gas flow channel 55C is bent toward the space below the back frame 3 substantially at right angles below the back frame 3.

The inflator 40 is connected to the end of the portion which is bent toward the space below the back frame 3, with the length directed to the space below the back frame 3. Briefly, the inflator 40 of this embodiment is disposed below the back frame 3.

The lap-bag gas outlet 53 is disposed at the upper end of the gas flow channel 55C. A gas flow channel 54C branches off forward from the middle of the gas flow channel 55C (the middle of the vertically extending portion) along the outer side of the side frame 1a, at the end of which the seat-bag gas outlet 52 is disposed.

In this embodiment, as has been described, the inflator may be disposed in any positions, such as outside or inside the side frame (under the seat cushion) or below the back frame.

In this embodiment, the manifold serving as distribution passage and the base plate of the holder serving as lap-anchor- and inflator-mounting member are provided separately and the manifold is mounted to the base plate with a fixing member. According to the invention, however, the manifold and the base plate may be integrated to one in advance by die casting etc.

The lap anchor of the foregoing embodiments is fixed to the base plate via a pretensioner (connector). However, according to the invention, the lap anchor may be fixed directly to the base plate with a bolt etc. without via the pretensioner (connector) etc.

According to the invention, the lap anchor may be fixed rotatably to the base plate.

Figure 11:
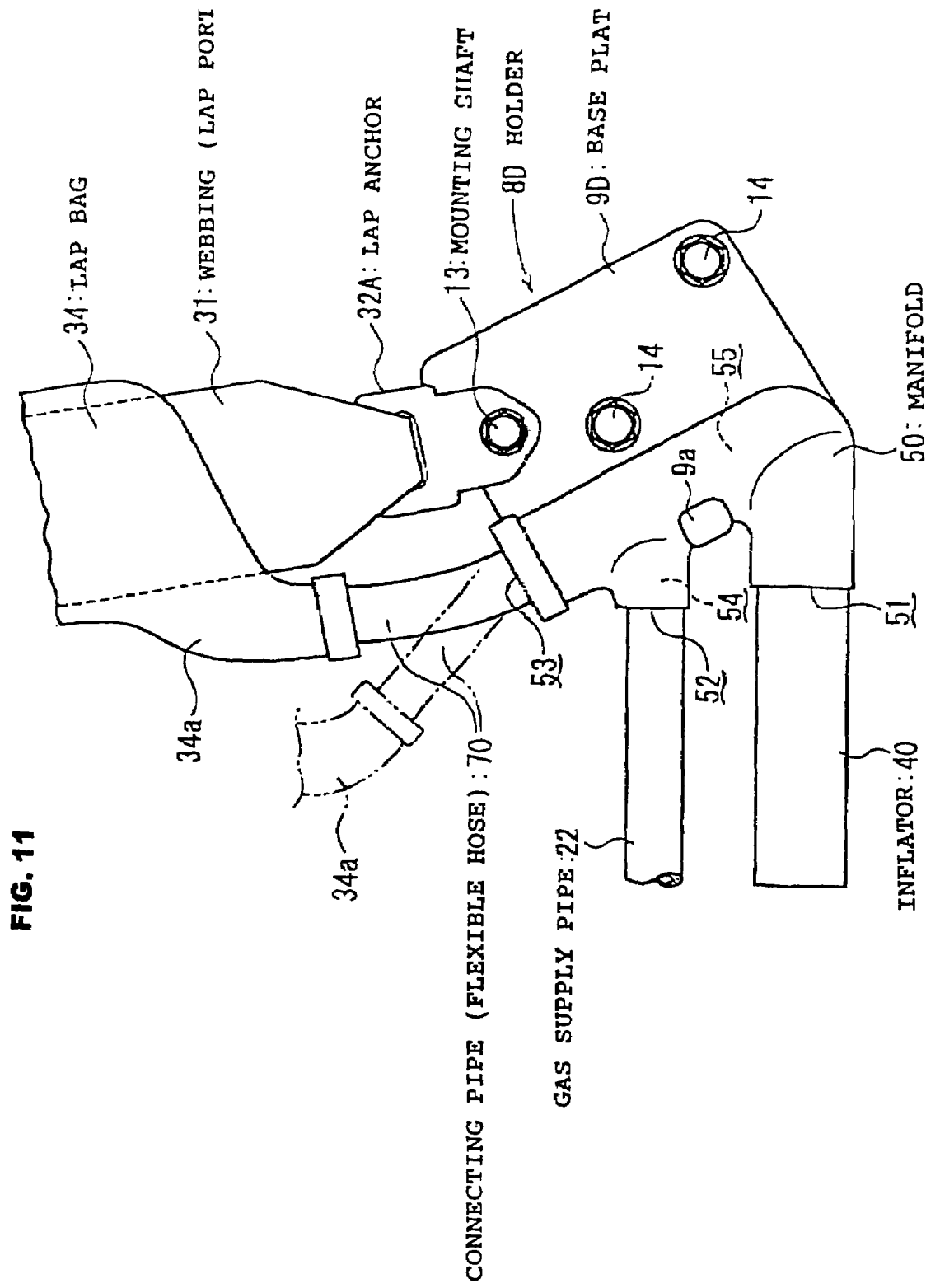
FIG. 11 is a side view of an essential part of another mounting structure of a lap anchor.

FIG. 11 is a side view of an essential part of the mounting structure of the lap anchor to the holder (base plate) with such a structure.

In the embodiment of FIG. 11, the base plate 9D of a holder 8D serving as lap-anchor- and inflator-mounting member does not include the pretensioner 10 serving as lap-anchor connector. A lap anchor 32A disposed at the end of the webbing 31 adjacent to the lap portion is mounted directly to the base plate 9D such that it can rotate forward and backward around a mounting shaft 13. The base plate 9D is fixed to the side frame 1a (not shown in FIG. 11) with fixing bolts so that it cannot rotate.

In this embodiment, the duct 34a for introducing gas to the lap bag 34 disposed to the lap portion of the webbing 31 connects to a bendable connecting pipe 70 made of a flexible hose. The duct 34a is connected to the lap-bag gas outlet 53 of the manifold 50 mounted to the base plate 9D and serving as distribution passage via the connecting pipe 70. Accordingly, when the lap anchor 32A rotates around the mounting shaft 13, the connecting pipe 70 is bent freely following the back-and-forth movement of the lap bag 34 with the rotation and as such, the communication between the gas flow channel 55 of the manifold 50 and the duct 34a for introducing gas to the lap bag 34 is maintained constantly.

The other structures of the embodiment are the same as those of the embodiment of FIGS. 1 to 6, in which the same reference numerals of FIG. 11 as those of FIGS. 1 to 6 denote the same components.

Since the lap anchor 32A is mounted to the base plate 9D of the holder 8D such that it can rotate forward and backward, the lap anchor 32A rotates with or following the size and motion of the body of the occupant sitting in the seat. Therefore, the stress applied to the connection between the webbing 31 and the lap anchor 32A is reduced.

Figure 12:
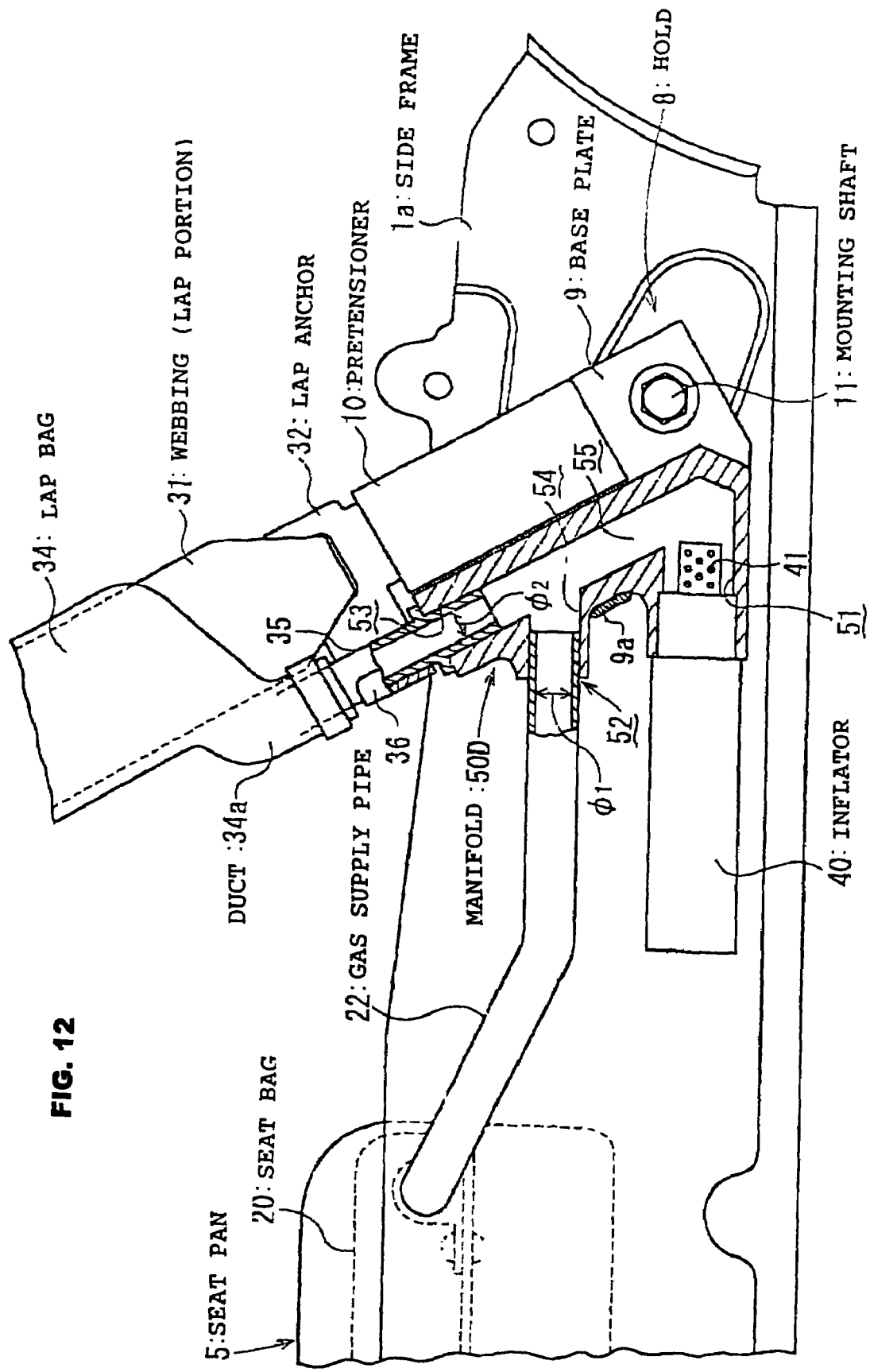
FIG. 12 is a side view of an essential part of an occupant protection system according to an embodiment.

FIG. 12 is a side view of an essential part of an occupant protection system according to an embodiment.

Also in the occupant protection system, the gas from one inflator 40 is distributed to the seat bag 20 disposed on the seat pan 5 under the front portion of the seat cushion (not shown) and the lap bag 34 disposed along the lap portion of the seatbelt webbing 31 by a manifold 50D serving as distribution passage.

Also in this embodiment, the manifold 50D includes the gas inlet 51 connected to the gas port 41 of the inflator 40, the respective gas outlets 52 and 53 for the seat bag 20 and the lap bag 34, and the gas flow channels 54 and 55 that communicate the gas inlet 51 with the gas outlets 52 and 53. To the gas outlet 52, the gas supply pipe 22 for the seat bag 20 is connected; to the gas outlet 53, the pipe (coupler) 35 connected to the duct 34a for introducing gas to the lap bag 34 is connected. Although the manifold 50D according to the embodiment has no check valve for preventing the backward flow of gas, it may have the check valve as in the manifold 50 of FIGS. 6(a) and 6(b), and 7(a) and 7(b).

In the occupant protection system, the amounts of gas to be distributed to the seat bag 20 and the lap bag 34 are controlled by selecting the inside diameter (channel diameter) $\phi_1$ of the pipe 22 and the inside diameter $\phi_2$ of the pipe 35. For example, according to the embodiment, the inside diameter $\phi_1$ of the pipe 22 is larger than the inside diameter $\phi_2$ of the pipe 35. Accordingly, when the inflator 40 emits a jet of gas, the gas is supplied more to the seat bag 20 and, when the seat bag 20 and the lap bag 34 inflate, respectively, the inner pressure of the seat bag 20 becomes higher, while the inner pressure of the lap bag 34 becomes lower.

The other structures of the occupant protection system are the same as those of the occupant protection system of FIGS. 1 to 6(b) and the same reference numerals of FIG. 12 as those of FIGS. 1 to 6(b) denote the same components.

In this occupant protection system, the amounts of gas to be distributed to the seat bag 20 and the lap bag 34 are controlled by selecting the respective inside diameters $\phi_1$ and $\phi_2$ of the pipes 22 and 35. This simplifies the structure and also the system assembly work, and reduces the cost of constructing the system. The specifications of the system (the inner pressures, inflation rates, etc. of the bags 20 and 34 in inflation) can be changed easily and at low cost only by replacing the pipes 22 and 35 with pipes with different inside diameters without changing the design of the bags 20 and 34 etc.

Figure 13:
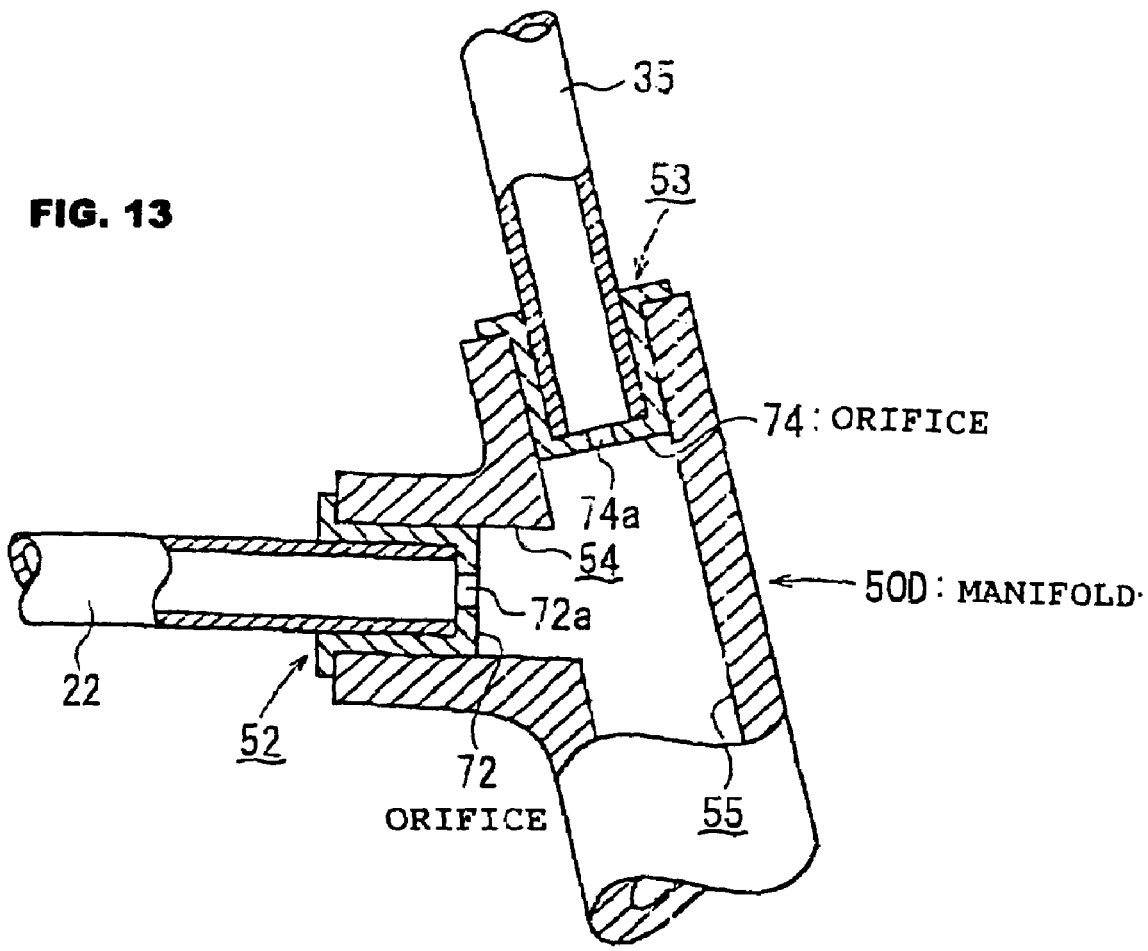
FIG. 13 is a sectional view of a manifold (distribution passage) of an occupant protection system according to another embodiment.

FIG. 13 is a sectional view of a manifold (distribution passage) of an occupant protection system according to another embodiment.

In this embodiment, the seat-bag gas outlet 52 and the lap-bag gas outlet 53 of the manifold 50D have orifices 72 and 74 for controlling the gas flow rate, respectively. The respective gas supply pipes 22 and 35 for the seat bag 20 and lap bag 34 are supplied with gas through the respective gas openings 72a and 74a of the orifices 72 and 74.

In this occupant protection system, the amounts of gas to be distributed to the seat bag (not shown) and the lap bag (not shown) are controlled by selecting the inside diameters of the respective openings 72*a* and 74*a* of the orifices 72 and 74. For example, according to the embodiment, the diameter of the opening 72*a* of the orifice 72 is larger than that of the opening 74*a* of the orifice 74. Accordingly, when the inflator (not shown) emits a jet of gas, the gas is supplied more to the pipe 22 to the seat bag through the opening 72*a* of the orifice 72. Consequently, when the seat bag and the lap bag inflate, respectively, the inner pressure of the seat bag becomes higher, while the inner pressure of the lap bag becomes lower.

The other structures of the occupant protection system are the same as those of the occupant protection system of FIG. 12.

In this occupant protection system, the amounts of gas to be distributed to the seat bag and the lap bag can easily be controlled by selecting appropriate opening diameters of the orifices 72 and 74.

Although in this embodiment the amounts of gas to be distributed to the bags are controlled only by selecting the opening diameters of the orifices 72 and 74, the amount of gas may be controlled by selecting both of the opening diameters of the orifices 72 and 74 and the inside diameters of the pipes 22 and 35.

Figure 14:
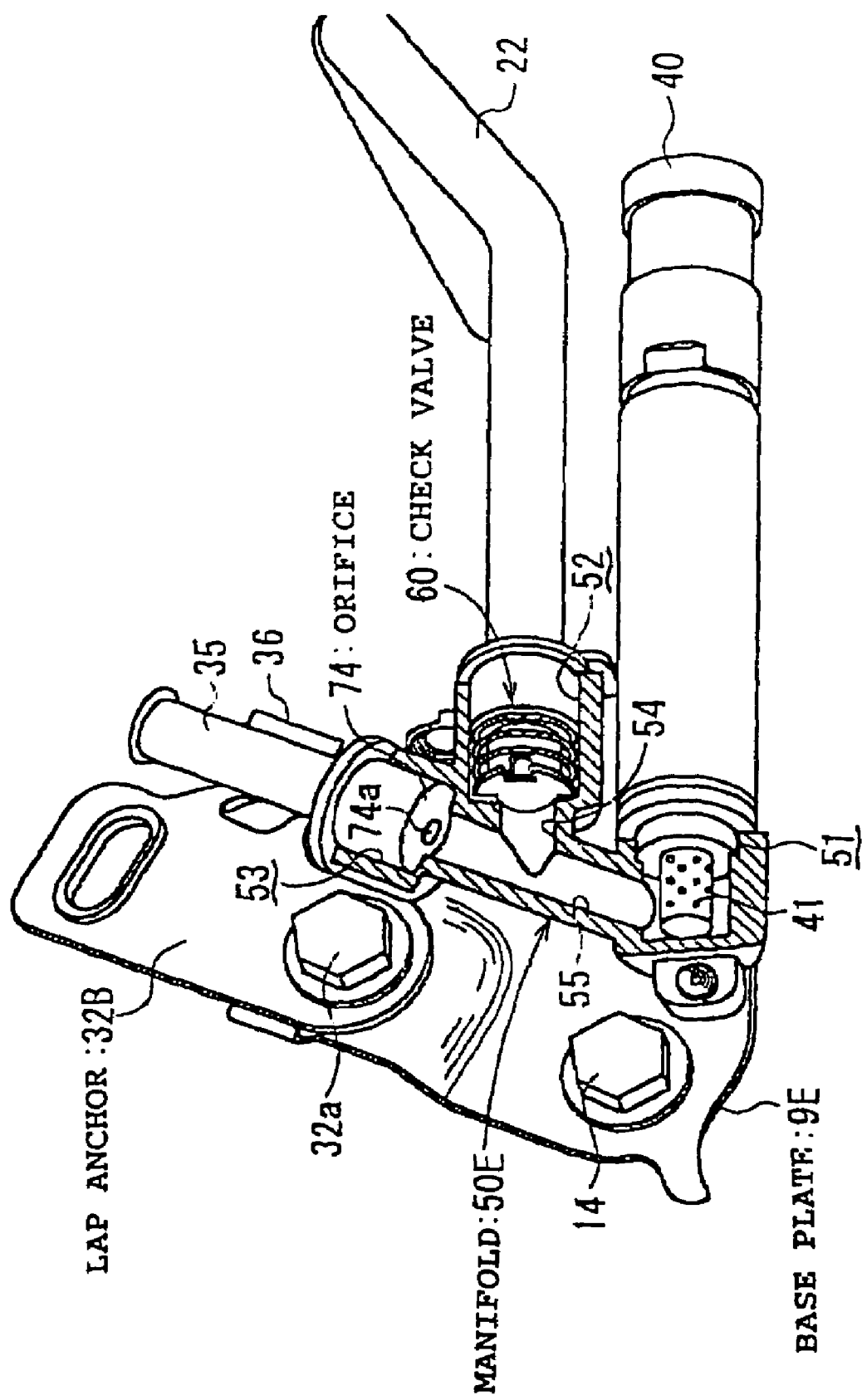
FIG. 14 is a perspective view (partially in section) of an essential part of an occupant protection system according to yet another embodiment.

FIG. 14 is a perspective view (partially in section) of an essential part of an occupant protection system according to yet another embodiment.

In this embodiment, the seat-bag gas outlet 52 of a manifold (gas distribution passage) 50E includes the check valve 60 having the function of preventing the backward flow of gas from the seat bag to the manifold 50E and a flow-rate limiting function of limiting the amount of gas flowing forwardly from the manifold 50E to the seat bag. The check valve 60 is the same as that of FIG. 6 except that it is disposed differently between the seat-bag gas outlet 52 and the lap-bag gas outlet 53. The lap-bag gas outlet 53 of the manifold 50E has the orifice 74 for controlling gas flow rate as in FIG. 13.

In this occupant protection system, the amounts of gas to be distributed to the seat bag and the lap bag are controlled by selecting the permissible amount of gas flowing forward through the check valve 60 (the opening diameter of the through hole 61*e* of the valve body 61, refer to FIG. 6) and the diameter of the opening 74*a* of the orifice 74.

In this embodiment, the base plate 9E which retains the manifold 50E is mounted to a seat-side frame opposite to that of the base plates 9A to 9D in the foregoing embodiments. The manifold 50E is fixed to the base plate 9E with rivets (not shown). The lap anchor 32B of this embodiment is fastened to the base plate 9E with bolts (32*a*) without via the pretensioner 10. The other structures of the occupant protection system are substantially the same as those of the occupant protection system of FIG. 12.

With this occupant protection system, appropriate amounts of gas can be distributed to the seat bag and the lap bag owing to the flow-rate control function of the orifice 74 and the forward-flow-rate limiting function of the check valve 60. The check valve 60 also prevents the backward flow of gas to the manifold 50E, thus allowing the inner pressures of the inflated seat bag and lap bag to be maintained high for a long time.

Also in this embodiment, the gas distribution amount to the bags may be controlled by using selection of the inside diameters of the pipes 22 and 35 at the same time.

Figure 15A:
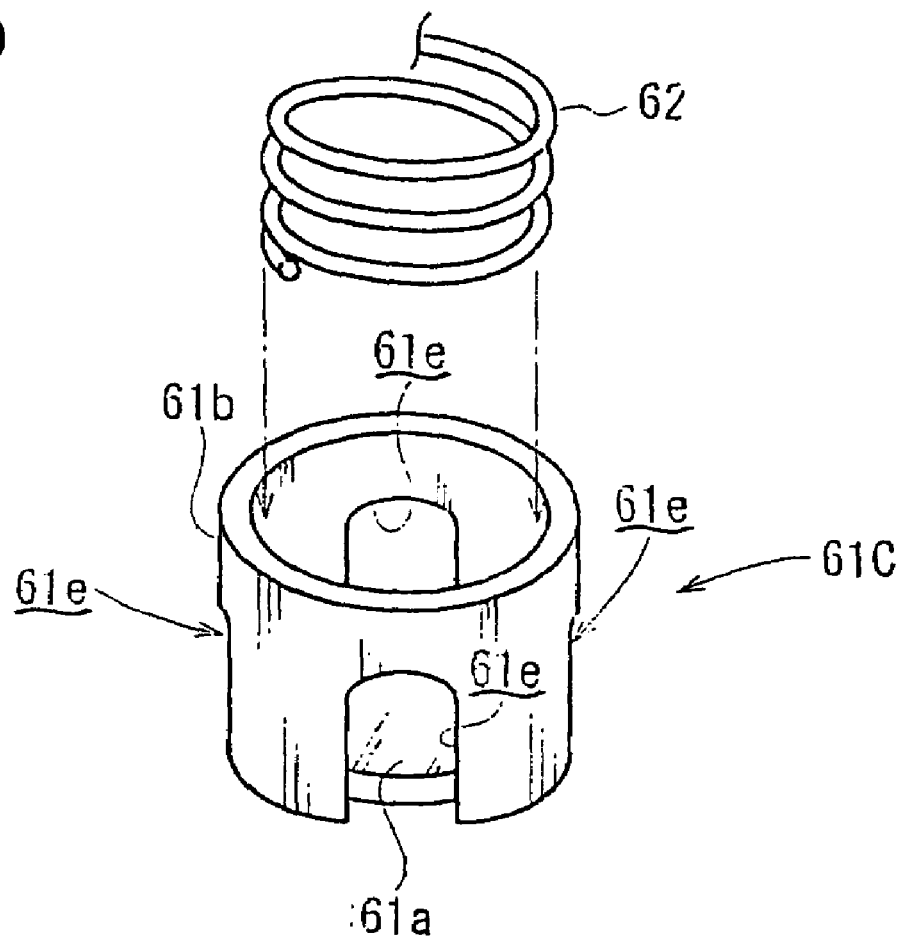
FIGS. 15(a) and 15(b) are perspective views of another structural example of the valve body of a check valve.
Figure 15B:
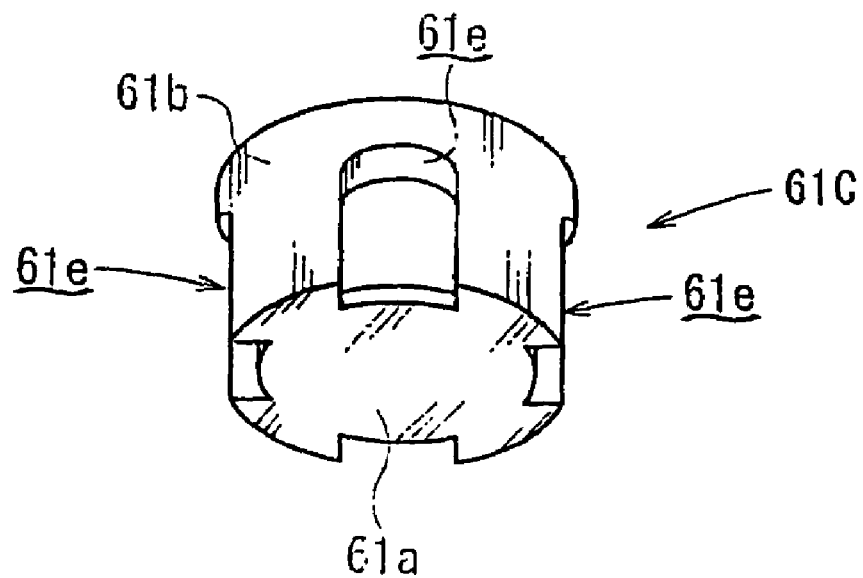
Figure 16A:
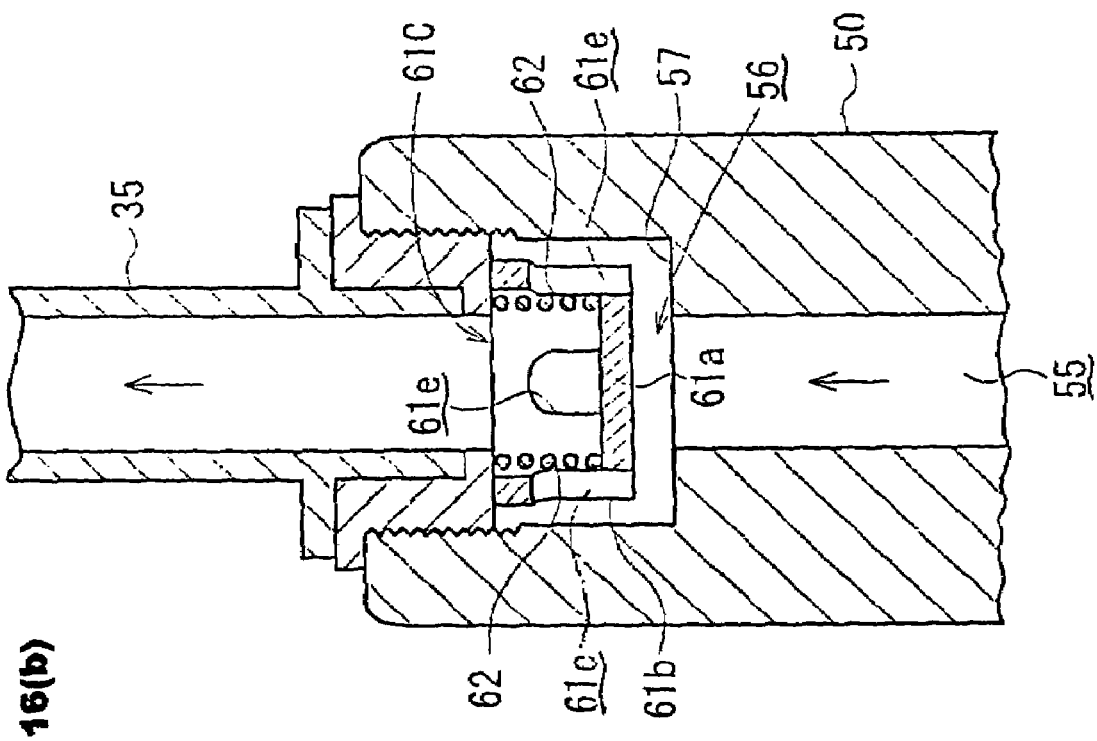
FIGS. 16(a) and 16(b) are sectional views showing the operation of the check valve in FIGS. 15(a) and 15(b).
Figure 16B:
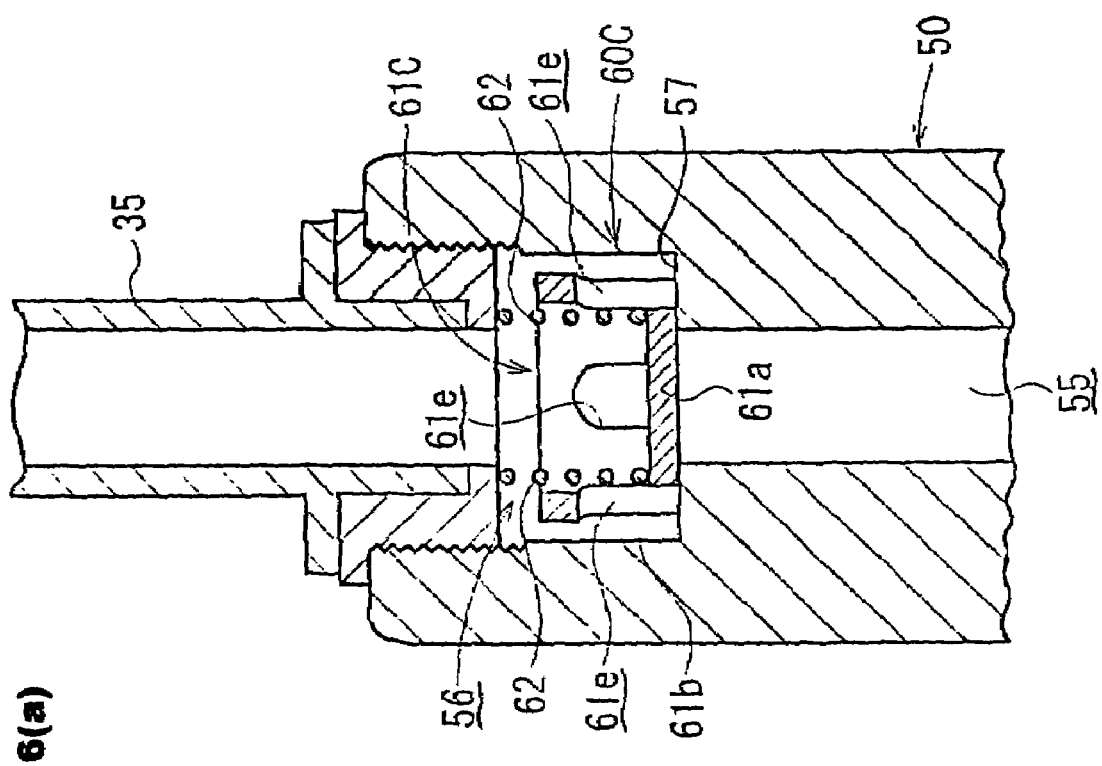

FIGS. 15(*a*), 15(*b*) and 16(*a*), 16(*b*) show another check valve according to another embodiment. FIGS. 15(*a*) and 15(*b*) are perspective views of the valve body of the check valve, as viewed from the lower stream and upper stream of the gas flow channel, respectively. FIGS. 16(*a*) and 16(*b*) are longitudinal sectional views showing the check valve when closing and releasing the gas flow channel, respectively.

Also in this embodiment, the check-valve housing 56 is provided on the lower stream of the gas flow channel 55. The check-valve housing 56 has therein a valve body 61C of the check valve 60C and the coil spring 62. As in the embodiment of FIGS. 5 and 6, the check-valve housing 56 is a chamber formed by increasing the diameter of the gas flow channel 55. The surface of the step between the check-valve housing 56 and the gas flow channel 55 upstream thereof serves as the valve seat 57 on which the valve body 61C is placed.

In this embodiment, the valve body 61C includes the valve cover 61*a* placed on the valve seat 57 to close the gas flow channel 55, the substantially cylindrical peripheral wall 61*b* upstanding from the outer periphery of the valve cover 61*a* downstream, and the through hole 61*e* formed in the side circumference of the peripheral wall 61*b*. Briefly, the valve body 61C has a structure in which the flange 61*c* is omitted from the valve body 61 of the valve 60 in FIGS. 5 and 6. Also the through hole 61*e* of this embodiment is disposed in four places around the peripheral wall 61*b*.

In this embodiment, the coil spring 57 is disposed inside the peripheral wall 61*b*, one end of which is in contact with the valve cover 61*a* and the other end is in contact with the step face between the check-valve housing 56 and a coupler connecting portion (its reference numeral is omitted) downstream thereof (hereinafter, the step face is referred to as the downstream step face of the check-valve housing 56).

Figure 5B:
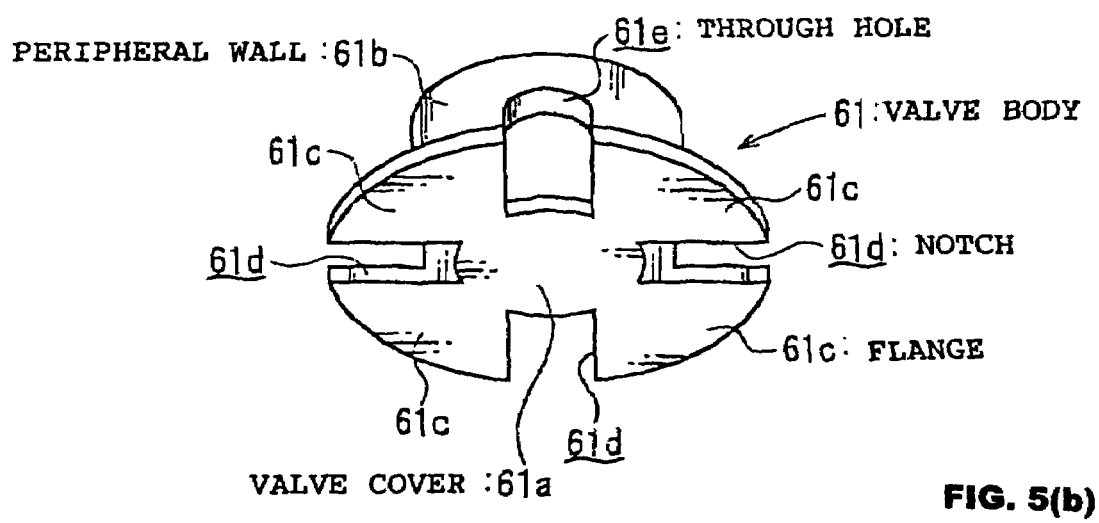

The operation of the check valve 60C is the same as that of the check valve 60 of FIGS. 5 and 6.

Specifically, with the check valve 60C, when an inflator (not shown) emits no gas, the valve body 61C is placed on the valve seat 57 by the biasing force of the coil spring 62, so that the valve cover 61*a* closes the gas flow channel 55, as shown in FIG. 16(*a*). When the inflator emits a jet of gas, the valve cover 61*a* separates from the valve seat 57 against the biasing force of the coil spring 62 by the pressure of the gas flowing from the inflator into the gas flow channel 55 to open the gas flow channel 55. Thus, the gas flows from the gas flow channel 55 into the coupler 35 through the check-valve housing 56, thereby flowing into the lap bag (not shown).

At that time, the valve body 61 moves downstream as the pressure of the gas flowing from the inflator into the gas flow channel 55 increases and as such, the end of the peripheral wall 61*b* comes close to the downstream step face of the check-valve housing 56, thus limiting the amount of gas flowing into the coupler 35. When the gas pressure exceeds a specified value, the end face of the peripheral wall 61*b* comes into contact with the downstream step face of the check-valve housing 56, as shown in FIG. 16(*b*). Therefore, only gas flowing into the internal space of the peripheral wall 61*b* via the through hole 61*e* is introduced into the coupler 35. This prevents excess gas supply to the lap bag 34.

The check valve 60C has a simpler structure than the check valve 60 of FIGS. 5 and 6, allowing a check valve with a gas-flow limiting facility to be provided at a lower cost.

It is to be understood that the foregoing embodiments are only examples of the present invention and the invention is not limited to the foregoing embodiments.

What is claimed is:

1. An occupant protection system for a vehicle seat, the occupant protection system comprising:
    a seat belt for restraining a passenger in the seat;
    anchors for the belt on both sides of the seat with one of the anchors comprising a releasably connected buckle and tongue on one side of the seat and a lap anchor on the other side of the seat;
    a seat airbag for being arranged to cause a portion of the seat to be lifted upon inflation thereof;
    a belt airbag extending along the seat belt to push the passenger toward the seat upon inflation thereof;
    a gas generator for supplying inflation gas to the seat and belt airbags and being disposed at the other side of the seat; and
    a common mounting member to which both the gas generator and the lap anchor are mounted with the common mounting member being disposed at the other side of the seat,
    wherein the gas generator and the airbags include a gas distribution passage therebetween in which a check valve is arranged and operable to substantially keep inflation gas from reverse flow out from one of the airbags, and the check valve has a substantially full flow position with gas from the gas generator substantially freely flowing through the gas distribution passage to the one airbag and a limited flow position with gas from the gas generator being restricted in flow to the one airbag to avoid excessive gas supply thereto.

2. An occupant protection system comprising:
    a seat airbag for being arranged inside or under a seat cushion;
    a lap belt airbag for being arranged along a lap belt portion of a seat belt;
    a gas generator for supplying inflation gas to the airbags; and
    variable size flow passages between the gas generator and the airbags to permit flow passage size to be selected for providing control over gas amounts distributed to the airbags,
    wherein the variable size flow passages comprise a manifold that receives gas from the gas generator and has gas flow channels to distribute gas to the airbags, and at least one flow restrictor member removably received in one of the manifold gas flow channels with the flow restrictor member having an orifice of a predetermined, fixed size with the orifice varying in size depending on the selected flow restrictor member for allowing selective control of the flow rate of gas to at least one of the airbags.

3. The occupant protection system of claim 2 wherein the variable size flow passages comprise a valve member received in another one of the manifold gas flow channels.

4. The occupant protection system of claim 2 wherein the variable size flow passage for the seat airbag is selected to be larger than the variable size flow passage for the lap belt airbag so that inner pressure of the seat airbag is greater than that of the lap belt airbag.

5. An occupant protection system comprising:
    a seat airbag for being arranged inside or under a seat cushion;
    a lap belt airbag for being arranged along a lap belt portion of a seat belt;
    a gas generator for supplying inflation gas to the airbags; and
    variable size flow passages between the gas generator and the airbags to permit flow passage size to be selected for providing control over gas amounts distributed to the airbags,
    wherein the variable size flow passages comprise a manifold that receives gas from the gas generator and has gas flow channels to distribute gas to the airbags, and at least one flow restrictor member received in one of the manifold gas flow channels that has an orifice that varies in size depending on the selected flow restrictor member, and the at least one flow restrictor member comprises two flow restrictor members for being received in the gas flow channels of the manifold.

6. The occupant protection system of claim 5 wherein the variable size flow passages further comprise coupling pipes connected to the manifold via the restrictor members.

* * * * *